(12) United States Patent
Chang et al.

(10) Patent No.: US 11,336,828 B2
(45) Date of Patent: May 17, 2022

(54) REFLECTION MODULE CAPABLE OF IMAGE STABILIZATION, CAMERA MODULE AND ELECTRONIC DEVICE

(71) Applicant: LARGAN DIGITAL CO., LTD., Taichung (TW)

(72) Inventors: Lin An Chang, Taichung (TW); Hao Jan Chen, Taichung (TW); Ming-Ta Chou, Taichung (TW); Chen-Yi Huang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 17/060,047

(22) Filed: Sep. 30, 2020

(65) Prior Publication Data

US 2022/0030168 A1 Jan. 27, 2022

(30) Foreign Application Priority Data

Jul. 22, 2020 (TW) ................................. 109124665

(51) Int. Cl.
 *H04N 5/232* (2006.01)
 *G03B 17/56* (2021.01)
 *G02B 27/64* (2006.01)

(52) U.S. Cl.
 CPC ....... *H04N 5/23283* (2013.01); *G02B 27/646* (2013.01); *G03B 17/565* (2013.01); *G03B 17/566* (2013.01)

(58) Field of Classification Search
 CPC .............. H04N 5/23283; G03B 17/566; G03B 17/565; G02B 27/646
 See application file for complete search history.

(56) References Cited

U.S. PATENT DOCUMENTS

| 8,213,783 | B2 | 7/2012 | Hu |
| 9,049,375 | B2 | 6/2015 | Wade |
| 9,116,361 | B2 | 8/2015 | Minamisawa |

(Continued)

FOREIGN PATENT DOCUMENTS

CN 111381343 A 7/2020

OTHER PUBLICATIONS

Taiwan Office Action dated Jun. 22, 2021 as received in application No. 109124665.

*Primary Examiner* — Gevell V Selby
(74) *Attorney, Agent, or Firm* — Maschoff Brennan

(57) ABSTRACT

A reflection module capable of image stabilization includes a reflecting element, a rotatable holder, a fixed base, a spherical supporting structure, an auxiliary supporting structure and an image stabilizing actuator. The reflecting element having a reflecting surface for folding optical path of incident light is disposed on the rotatable holder. The fixed base is connected to the rotatable holder via an elastic element. The spherical supporting structure is disposed between the rotatable holder and the fixed base. The auxiliary supporting structure disposed on at least one of the rotatable holder and the fixed base and corresponds to the spherical supporting structure. At least part of the image stabilizing actuator is disposed on the rotatable holder for driving the rotatable holder to rotate by taking the spherical supporting structure as rotation center. The spherical supporting structure is a ball having at least three contact points with the auxiliary supporting structure.

29 Claims, 29 Drawing Sheets

(56) References Cited

U.S. PATENT DOCUMENTS

| | | | |
|---|---|---|---|
| 9,285,566 B2 | 3/2016 | Chan | |
| 10,261,337 B2 | 4/2019 | Yeon | |
| 10,394,046 B2 * | 8/2019 | Jeong | H04N 5/2253 |
| 10,416,472 B2 | 9/2019 | Jeong | |
| 10,481,410 B2 | 11/2019 | Kim | |
| 2013/0021485 A1 * | 1/2013 | Hsu | G02B 27/64 |
| | | | 348/208.99 |
| 2018/0095293 A1 * | 4/2018 | Yeon | H02P 6/006 |
| 2018/0224665 A1 * | 8/2018 | Im | G02B 7/021 |
| 2018/0299651 A1 | 10/2018 | Yu | |
| 2019/0129197 A1 * | 5/2019 | Kim | G03B 17/17 |
| 2020/0225442 A1 | 7/2020 | Weng et al. | |

\* cited by examiner

REFLECTION MODULE CAPABLE OF IMAGE STABILIZATION, CAMERA MODULE AND ELECTRONIC DEVICE

RELATED APPLICATIONS

This application claims priority to Taiwan Application 109124665, filed on Jul. 22, 2020, which is incorporated by reference herein in its entirety.

BACKGROUND

Technical Field

The present disclosure relates to a reflection module, a camera module and an electronic device, more particularly to a reflection module capable of image stabilization and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large size, which is unable to meet the requirements of the current technology trends. To achieve compactness, the optical systems may be configured to have a folded optical axis so as to reduce the dimension of the optical systems in a specific direction, thereby reducing the total system size. Moreover, the optical systems can be configured with anti-vibration function for achieving high image quality. However, to meet the abovementioned requirements, a driving unit of complex structure is required to drive an optical axis folding element, which results in more complex structure and more weight of the optical systems.

Accordingly, how to improve the optical systems for simplifying the structure of the lens assembly, achieving a compact size and maintaining high image quality so as to meet the requirement of high-end-specification electronic devices is an important topic in this field nowadays.

SUMMARY

According to one aspect of the present disclosure, a reflection module capable of image stabilization includes a reflecting element, a rotatable holder, a fixed base, a spherical supporting structure, an auxiliary supporting structure and an image stabilizing actuator. The reflecting element has a reflecting surface, and the reflecting element is disposed on the rotatable holder and configured to fold an optical path of incident light. The fixed base is connected to the rotatable holder via an elastic element. The spherical supporting structure is disposed between the rotatable holder and the fixed base. The auxiliary supporting structure is disposed on at least one of the rotatable holder and the fixed base, and the auxiliary supporting structure corresponds to the spherical supporting structure. At least a part of the image stabilizing actuator is disposed on the rotatable holder, and the image stabilizing actuator is configured to drive the rotatable holder to rotate by taking the spherical supporting structure as a rotation center. In addition, the spherical supporting structure is a ball, and the spherical supporting structure has at least three contact points with the auxiliary supporting structure.

According to another aspect of the present disclosure, a reflection module capable of image stabilization includes a reflecting element, a rotatable holder, a fixed base, a spherical supporting structure, an auxiliary supporting structure and an image stabilizing actuator. The reflecting element has a reflecting surface, and the reflecting element is disposed on the rotatable holder and configured to fold an optical path of incident light. The fixed base is connected to the rotatable holder via an elastic element. The spherical supporting structure is disposed between the rotatable holder and the fixed base. The auxiliary supporting structure is disposed on at least one of the rotatable holder and the fixed base, and the auxiliary supporting structure corresponds to the spherical supporting structure. At least a part of the image stabilizing actuator is disposed on the rotatable holder, and the image stabilizing actuator is configured to drive the rotatable holder to rotate by taking the spherical supporting structure as a rotation center. In addition, the spherical supporting structure includes at least one spherical surface, the auxiliary supporting structure includes at least two convex surfaces, and the at least one spherical surface has at least two contact points with the at least two convex surfaces.

According to another aspect of the present disclosure, a reflection module capable of image stabilization includes a reflecting element, a rotatable holder, a fixed base, a spherical supporting structure, an auxiliary supporting structure and an image stabilizing actuator. The reflecting element has a reflecting surface, and the reflecting element is disposed on the rotatable holder and configured to fold an optical path of incident light. The fixed base is connected to the rotatable holder via an elastic element. The spherical supporting structure is disposed between the rotatable holder and the fixed base. The auxiliary supporting structure is disposed on at least one of the rotatable holder and the fixed base, and the auxiliary supporting structure corresponds to the spherical supporting structure. At least a part of the image stabilizing actuator is disposed on the rotatable holder, and the image stabilizing actuator is configured to drive the rotatable holder to rotate by taking the spherical supporting structure as a rotation center. In addition, the spherical supporting structure includes at least one spherical surface, and the at least one spherical surface has at least three contact points with the auxiliary supporting structure.

According to another aspect of the present disclosure, a camera module includes the aforementioned reflection module, an imaging lens module and an image sensor. The reflection module is disposed on an object side of the imaging lens module, and the image sensor is disposed on an image surface of the imaging lens module. In addition, the reflection module is configured to stabilize an image signal captured by the image sensor.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
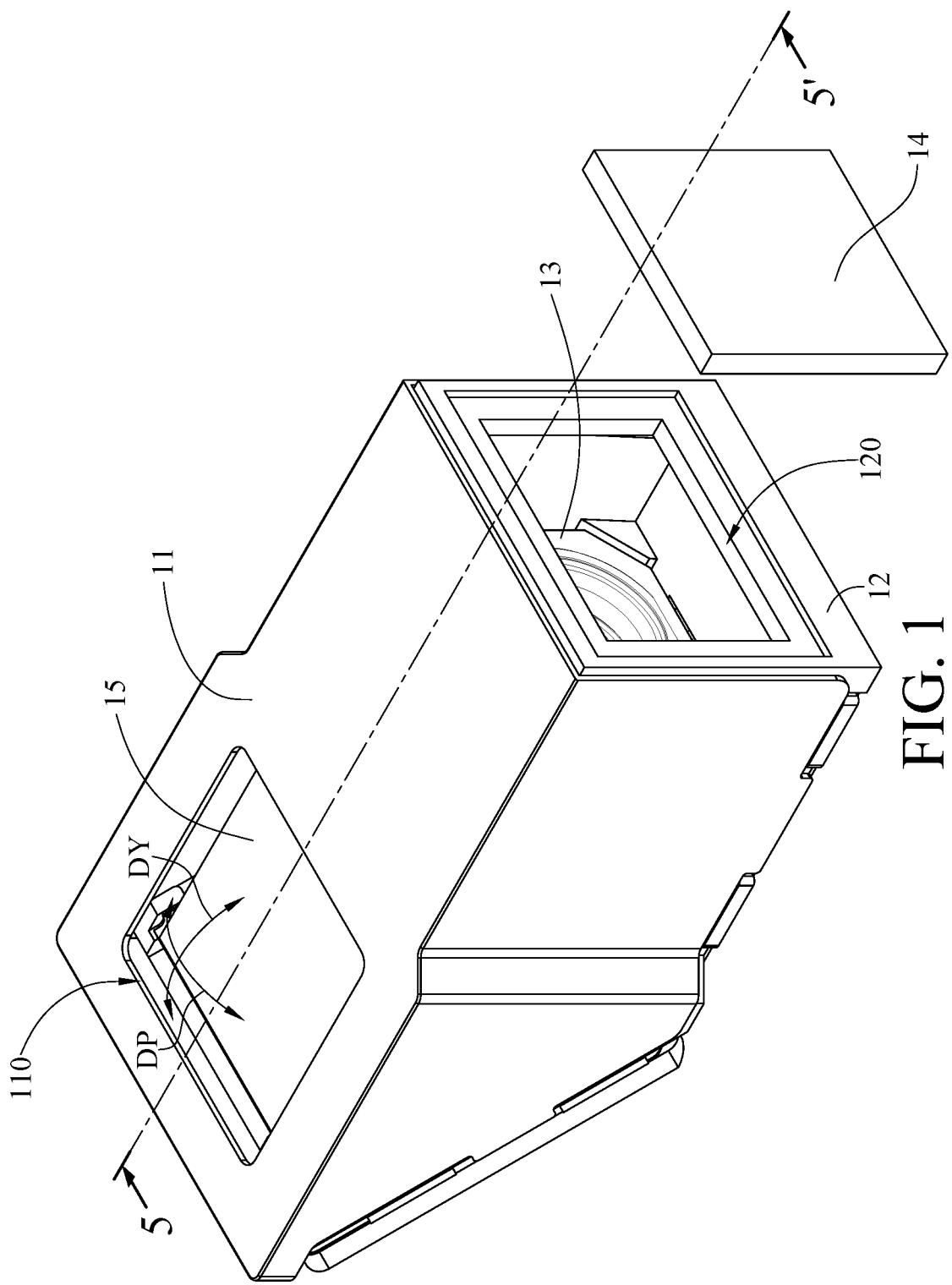
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a reflection module capable of image stabilization, and the reflection module includes a reflecting element, a rotatable holder, a fixed base, a spherical supporting structure, an auxiliary supporting structure and an image stabilizing actuator.

The reflecting element has a reflecting surface, and the reflecting element is disposed on the rotatable holder and configured to fold an optical path of incident light. The reflecting element can be, for example, a prism or a reflection mirror, but the present disclosure is not limited thereto. The fixed base is connected to the rotatable holder via an elastic element. The spherical supporting structure is disposed between the rotatable holder and the fixed base. The auxiliary supporting structure is disposed on at least one of the rotatable holder and the fixed base, and the auxiliary supporting structure corresponds to the spherical supporting structure. At least a part of the image stabilizing actuator is disposed on the rotatable holder, and the image stabilizing actuator is configured to drive the rotatable holder to rotate by taking the spherical supporting structure as a rotation center, such that the reflecting element can be rotated with the rotatable holder. In addition, the rotatable holder can pitch and yaw. Please refer to FIG. 34, which shows pitch DP and yaw DY in a rotatable holder of the camera module 10 of the electronic device 8.

According to the present disclosure, the spherical supporting structure of the reflection module capable of image stabilization serves as a fulcrum to provide the reflecting element with a degree of freedom in rotation, such that the requirement of image stabilization is achieved.

In one configuration, the spherical supporting structure can be a ball, and the spherical supporting structure has at least three contact points with the auxiliary supporting structure. Therefore, the spherical supporting structure and the auxiliary supporting structure contact each other in point contact, so the contact area between the spherical supporting structure and the auxiliary supporting structure is small, such that it is favorable for minimizing friction therebetween when the reflecting element rotates and reducing the offset of the rotation center; furthermore, it is favorable for the spherical supporting structure to rotate within a fixed position in a small rotation angle. Moreover, the ball can have two spherical surfaces respectively facing toward the rotatable holder and the fixed base, and the two spherical surfaces and the auxiliary supporting structure can abut against each other. Please refer to FIG. 5, which shows the spherical surface 1551 of the spherical supporting structure 155 abutting against the auxiliary balls 1561 of the auxiliary supporting structure 156, and the spherical surface 1552 of the spherical supporting structure 155 abutting against the pyramidal recess 1562 of the auxiliary supporting structure 15, wherein the spherical surface 1551 faces toward the fixed base 151 and the spherical surface 1552 faces toward the rotatable holder 153.

In one configuration, the spherical supporting structure can include at least one spherical surface, the auxiliary supporting structure can include at least two convex surfaces, and the at least one spherical surface can have at least two contact points with the at least two convex surfaces. Therefore, the spherical supporting structure and the auxiliary supporting structure contacting each other with convex surfaces is favorable for minimizing friction therebetween when the reflecting element rotates and reducing the offset of the rotation center; furthermore, it is favorable for preventing mechanical interference between the rotatable holder and the fixed base. Please refer to FIG. 23 and FIG. 24, which show the fixed base 451, the spherical supporting structure 455 and the auxiliary supporting structure 456 in the 4th embodiment of the present disclosure, wherein the spherical supporting structure 455 includes two balls 4553, the auxiliary supporting structure 456 includes two auxiliary balls 4561, and each of the two balls 4553 of the spherical supporting structure 455 has two contact points with the auxiliary balls 4561 of the auxiliary supporting structure 456. In addition, the at least one spherical surface of the spherical supporting structure can be a spherical surface of a ball or a spherical protrusion. Please refer to FIG. 5 and FIG. 25, which respectively show that the at least one spherical surface of the spherical supporting structure 155 is a spherical surface of a ball and the at least one spherical surface of the spherical supporting structure 555 is a spherical surface of a spherical protrusion, but the present disclosure is not limited the type of spherical supporting structure.

In one configuration, the spherical supporting structure can include at least one spherical surface, and the at least one spherical surface can have at least three contact points with the auxiliary supporting structure. Therefore, the spherical supporting structure and the auxiliary supporting structure contact each other in point contact, so the contact area between the spherical supporting structure and the auxiliary supporting structure is small, such that it is favorable for minimizing friction therebetween when the reflecting element rotates and reducing the offset of the rotation center; furthermore, it is favorable for the spherical supporting structure to rotate within a fixed position in a small rotation angle. Moreover, the at least one spherical surface of the spherical supporting structure can be a spherical surface of a ball or a spherical protrusion, but the present disclosure is not limited thereto.

The elastic element can provide a preload force to the rotatable holder in a direction towards the fixed base, such that the spherical supporting structure located between the fixed base and the rotatable holder supports the rotatable holder. Therefore, it is favorable for providing the feasibility of the rotatable holder assembled to the spherical supporting structure. Moreover, the elastic element can surround the spherical supporting structure. Therefore, it is favorable for providing an evenly distributed preload force so as to prevent the spherical supporting structure from being easily damaged. In this specification, the term of "one element being perpendicular to another element" can indicate that an angle between two elements (e.g., two lines, two surfaces, or one line and one surface) is 90 degrees or approximately 90 degrees.

The image stabilizing actuator can include at least one driving magnet and at least one driving coil. One of the driving magnet and the driving coil is disposed on the rotatable holder, and the other of the driving magnet and the driving coil is disposed on the fixed base. Therefore, it is favorable for providing a rotation driving force to the rotatable holder. Moreover, the driving magnet and the driving coil can face each other in a direction perpendicular to the reflecting surface. Therefore, it is favorable for forming an efficient space arrangement so as to achieve compactness. Moreover, the number of the at least one driving magnet can be at least two, and the number of the at least one driving coil can be at least two. Therefore, it is favorable for providing at least two axial rotation driving forces. In one configuration of at least two driving magnets, the reflection module can further include at least two position sensing elements, and the position sensing elements and the driving magnets can face each other in a direction perpendicular to the reflecting surface. Therefore, it is favorable for the position sensing elements to detect a position of the rotatable holder.

According to the present disclosure, the reflection module capable of image stabilization can further include a printed circuit board. One of the printed circuit board and the driving magnet is disposed on the rotatable holder, the other is disposed on the fixed base, and the driving coil is disposed on the printed circuit board. Therefore, it is favorable for the printed circuit board to provide driving current for the driving coil.

When a curvature radius of the spherical supporting structure is R, and a minimum distance between the spherical supporting structure and the reflecting surface is D, the following condition can be satisfied: $0.3<R/D<12$. Therefore, it is favorable for obtaining a proper rotation angle and a proper ratio range of rotation stability. Moreover, the following condition can also be satisfied: $0.5<R/D<10$. Therefore, it is favorable for obtaining an even better ratio range of rotation stability. Please refer to FIG. 5, which shows a schematic view of R and D according to the 1st embodiment of the present disclosure.

According to the present disclosure, there can be no relative displacement between the spherical supporting structure and the fixed base. Therefore, it is favorable for the spherical supporting structure to be more efficiently assembled.

The auxiliary supporting structure can include a ball, a spherical protrusion or a pyramidal recess, and the present disclosure is not limited thereto. In one configuration, the auxiliary supporting structure can include at least two auxiliary balls configured for supporting the spherical supporting structure, and the at least two auxiliary balls have the at least two convex surfaces. Therefore, the auxiliary supporting structure contacting the spherical supporting structure with auxiliary balls is favorable for more effectively reducing friction therebetween. Moreover, the auxiliary supporting structure can also include at least three auxiliary balls. In one configuration, the auxiliary supporting structure can include at least two spherical protrusions configured for supporting the spherical supporting structure, and the at least two spherical protrusions have the at least two convex surfaces. Therefore, the design of spherical protrusion is favorable for reducing manufacturing costs while achieving friction reduction effect. Moreover, the auxiliary supporting structure can also include at least three spherical protrusions. In one configuration, the auxiliary supporting structure can include a pyramidal recess, and the pyramidal recess is configured to support the spherical supporting structure. Therefore, the design of pyramidal recess is favorable for increasing manufacturing efficiency and structural stability of the spherical supporting structure. Moreover, the pyramidal recess can be a pyramid shape having a triangular or rectangular base and plural lateral surfaces, but the present disclosure is not limited thereto.

The spherical supporting structure can be made of ferromagnetic material, such that the spherical supporting structure can be attracted to the rotatable holder or the fixed base by magnetic force. Therefore, it is favorable for increasing assembling stability of the spherical supporting structure.

The reflecting element can be a plastic prism manufactured by injection molding. Therefore, it is favorable for providing the manufacturability of the plastic prism so as to increase the production capacity of the reflecting element. Moreover, the reflecting element can further have a light entrance surface and a light exit surface, the light entrance surface and the reflecting surface are disposed corresponding to each other in the light entrance direction, and the light exit surface and the reflecting surface are disposed corresponding to each other in the light exit direction, such that light passes through, in order from an object side to an image side along the optical path, the light entrance surface, the reflecting surface and the light exit surface. Moreover, at least one of the light entrance surface and the light exit surface can have an optical aspheric surface, such that the reflecting element can have light refractive power. Therefore, it is favorable for providing better optical resolving power.

The present disclosure provides a camera module including the aforementioned reflection module capable of image stabilization, an imaging lens module and an image sensor. The reflection module is disposed on the object side of the imaging lens module, and the image sensor is disposed on an image surface of the imaging lens module. In addition, the reflection module is configured to stabilize the image signal captured by the image sensor.

According to the present disclosure, the reflecting element can further have an engagement structure surrounding the reflecting surface, and the reflecting element can be attached to the rotatable holder via the engagement structure. Therefore, it is favorable for minimizing assembly tolerance of the reflecting element and for the geometric center of the reflecting element to be aligned with the rotation center, thus maintaining image quality. Moreover, the engagement structure is configured to align the geometric center of the reflecting surface with the center of the spherical supporting structure, which can further make the light exit surface of the reflecting element coaxially aligned with the optical axis of the imaging lens module.

According to the present disclosure, the camera module can further include an auto focus driving unit. At least a part of the auto focus driving unit is disposed on the imaging lens module, and the auto focus driving unit is configured to drive the imaging lens module to move in a direction parallel to its optical axis.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
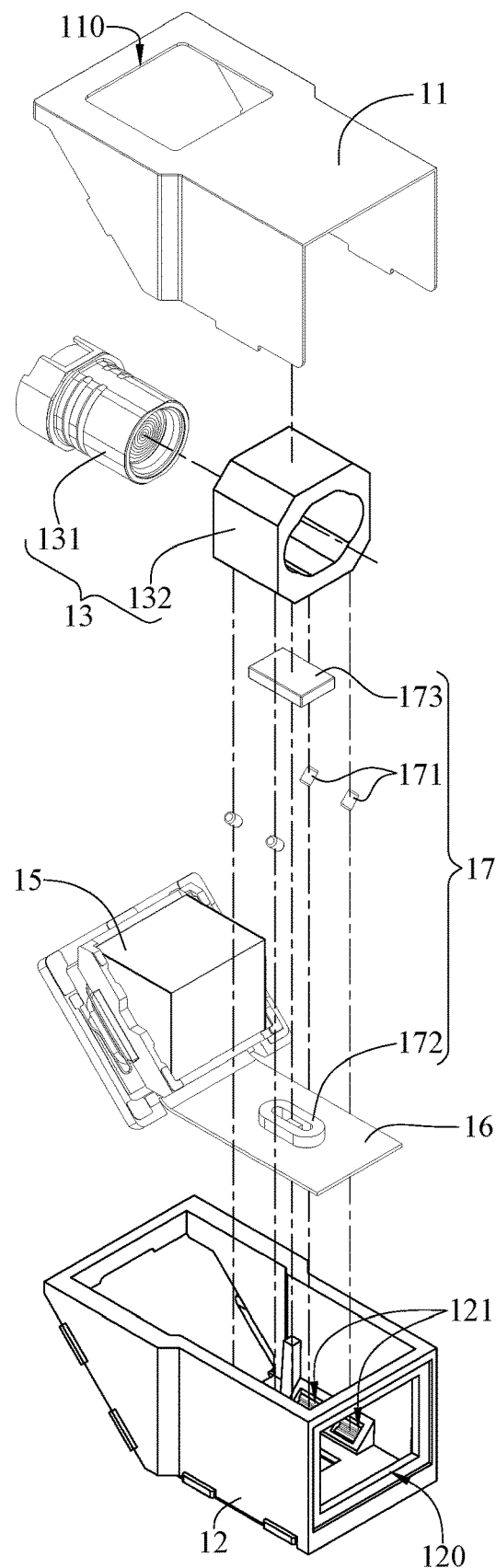
FIG. 2 is a partially exploded view of the camera module in FIG. 1.
Figure 3:
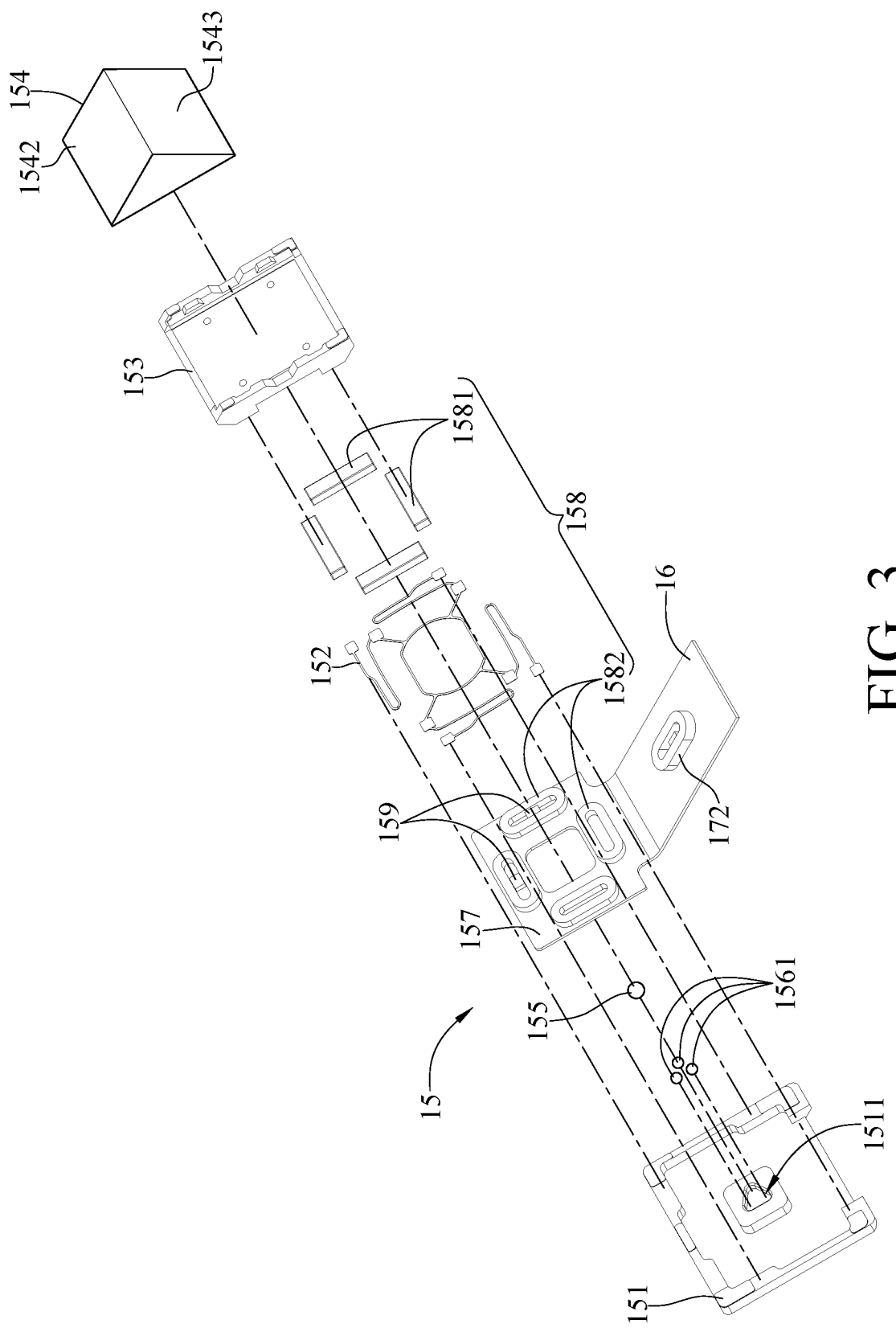
FIG. 3 is an exploded view of some components of the camera module in FIG. 1.
Figure 4:
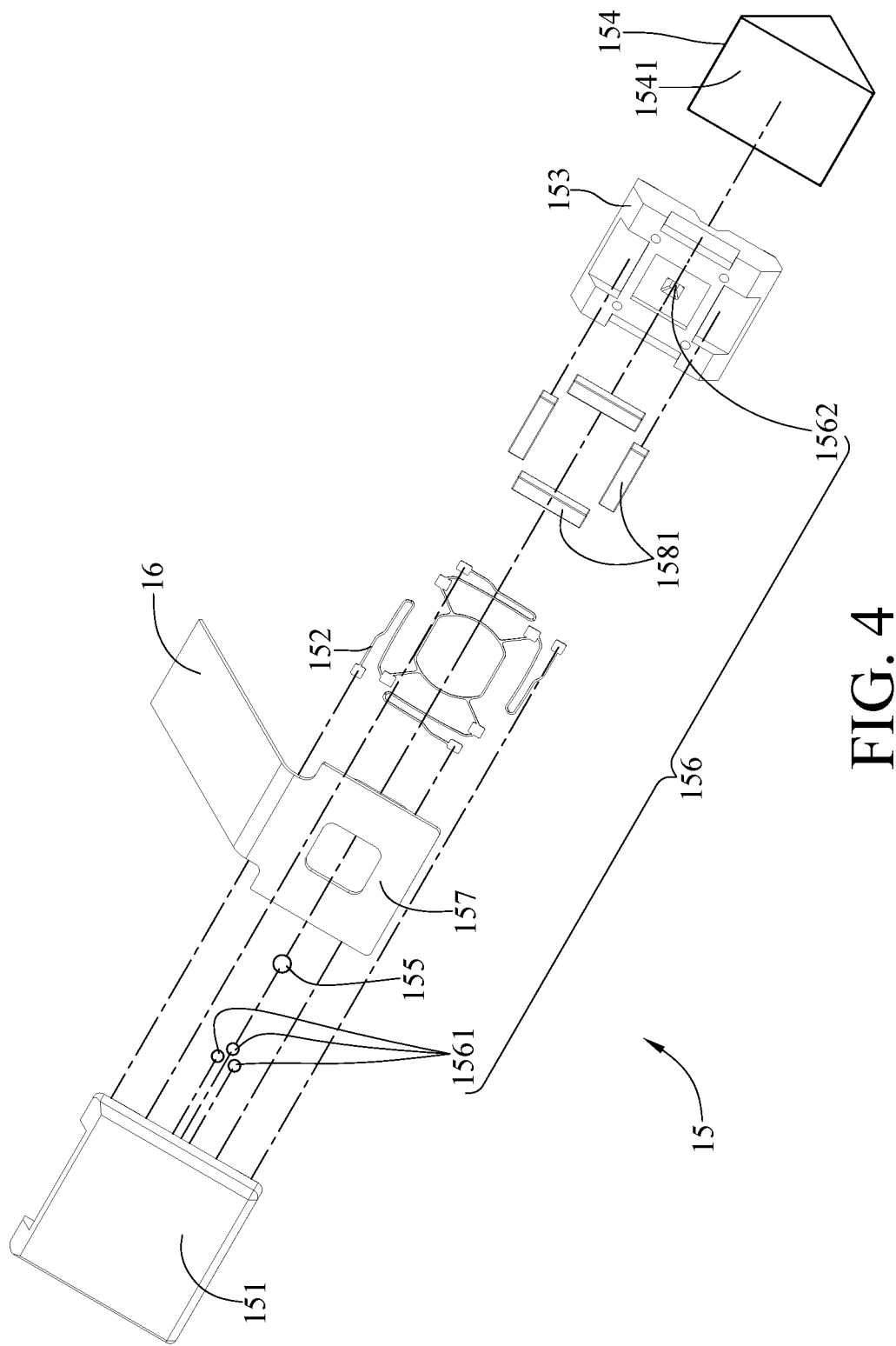
FIG. 4 is another exploded view of some components of the camera module in FIG. 1.
Figure 5:
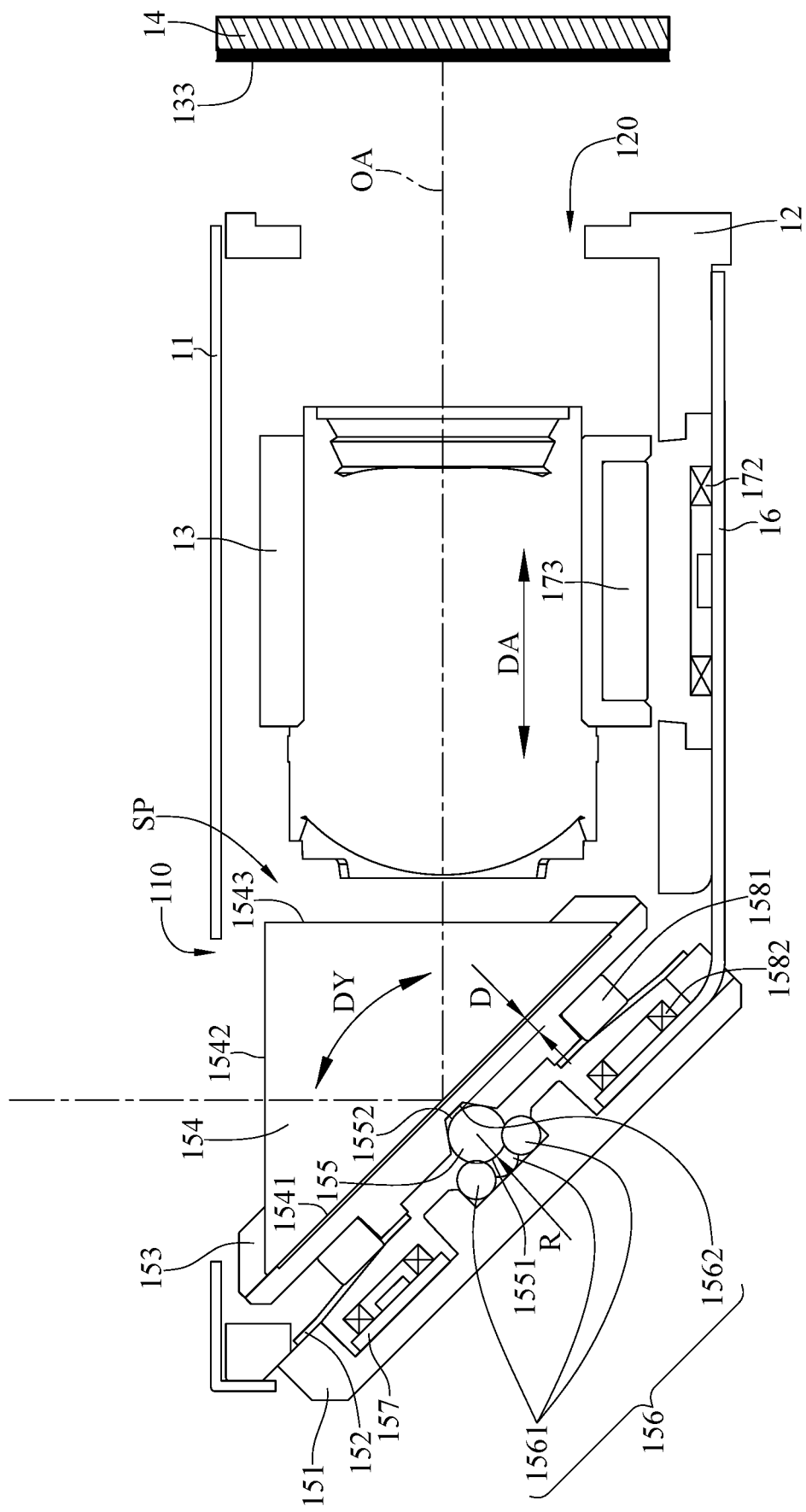
FIG. 5 is a cross-sectional view of the camera module along line 5-5' in FIG. 1.
Figure 7:
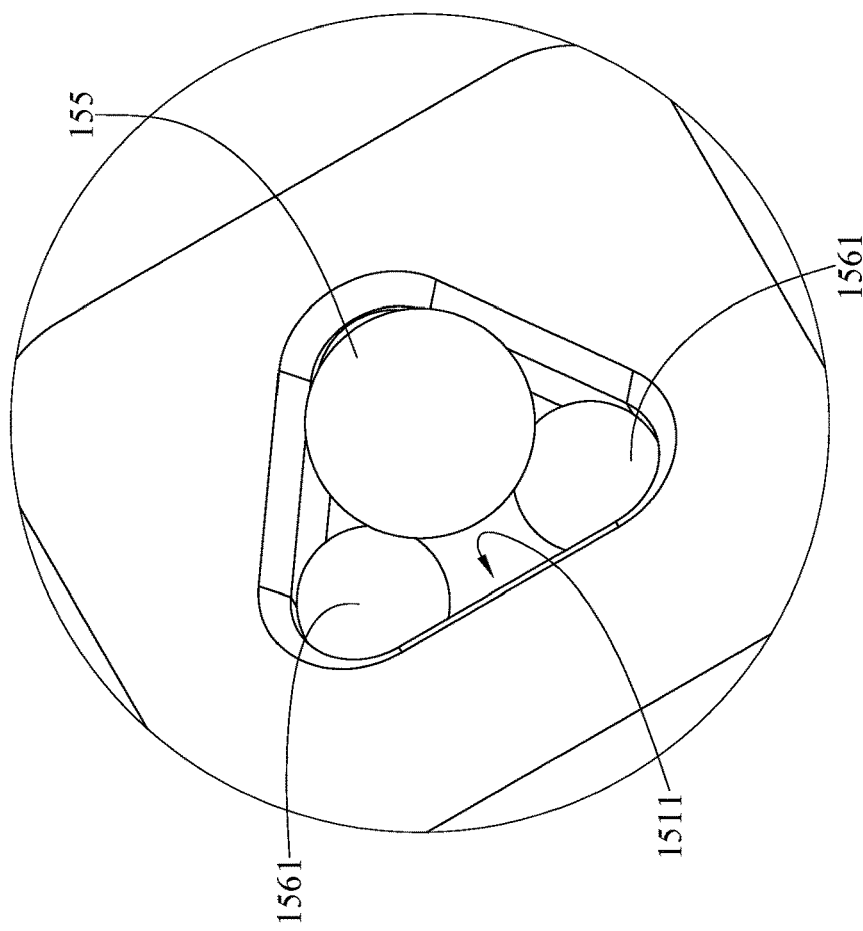
FIG. 7 is an enlarged view of region A of FIG. 6.
Figure 6:
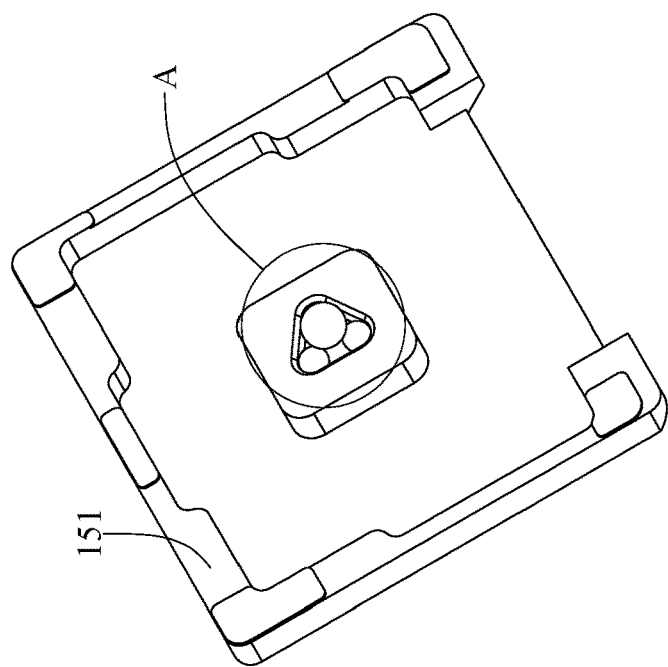
FIG. 6 is a perspective view of a fixed base, a spherical supporting structure and an auxiliary supporting structure in FIG. 3.

Please refer to FIG. 1 to FIG. 7, where FIG. 1 is a perspective view of a camera module according to the 1st embodiment of the present disclosure, FIG. 2 is a partially exploded view of the camera module in FIG. 1, FIG. 3 is an exploded view of some components of the camera module in FIG. 1, FIG. 4 is another exploded view of some components of the camera module in FIG. 1, FIG. 5 is a cross-sectional view of the camera module along line 5-5' in FIG. 1, FIG. 6 is a perspective view of a fixed base, a spherical supporting structure and an auxiliary supporting structure in FIG. 3, and FIG. 7 is an enlarged view of region A of FIG. 6.

In this embodiment, a camera module 10 includes a casing 11, a frame body 12, an imaging lens module 13, an image sensor 14, a reflection module capable of image stabilization 15, a first printed circuit board 16 and an auto focus driver unit 17.

The casing 11 is disposed on the frame body 12, and the casing 11 and the frame body 12 together form an accommodating space SP. The casing 11 has an aperture 110 for light entering, and the frame body 12 has an opening 120 for light exiting.

The imaging lens module 13 is disposed in the accommodating space SP, and the imaging lens module 13 includes an imaging lens assembly 131 and a lens holder 132 for holding the imaging lens assembly 131. In addition, the lens holder 132 is movably disposed in the accommodating space SP.

The image sensor 14 is disposed on an image surface 133 of the imaging lens module 13, and the reflection module 15 is disposed in the accommodating space SP and located on an object side of the imaging lens module 13. The reflection module 15 is configured to stabilize the image signal captured by the image sensor 14.

The reflection module 15 includes a fixed base 151, an elastic element 152, a rotatable holder 153, a reflecting element 154, a spherical supporting structure 155, an auxiliary supporting structure 156, a second printed circuit board 157, an image stabilizing actuator 158 and two position sensing elements 159.

The fixed base 151 is disposed on the frame body 12, and the rotatable holder 153 is connected to the fixed base 151 via the elastic element 152.

The reflecting element 154 is a plastic prism manufactured by injection molding, and the reflecting element 154 is disposed on the rotatable holder 153. The reflecting element 154 and the fixed base 151 are located on two opposite sides of the rotatable holder 153. The reflecting element 154 has a reflecting surface 1541, a light entrance surface 1542 and a light exit surface 1543. The reflecting surface 1541 is configured to fold an optical path of incident light. The light entrance surface 1542 is disposed corresponding to the reflecting surface 1541, and the light exit surface 1543 is disposed corresponding to the reflecting surface 1541. The light entrance surface 1542 faces toward the aperture 110 of the casing 11, and the light exit surface 1543 faces toward the imaging lens module 13. As such, incident light passes through, in order from the object side to the image side along the optical path, the light entrance surface 1542, the reflecting surface 1541 and the light exit surface 1543.

The spherical supporting structure 155 is a ball disposed between the rotatable holder 153 and the fixed base 151. The auxiliary supporting structure 156 includes three auxiliary balls 1561 and a pyramidal recess 1562 corresponding and configured to support the spherical supporting structure 155. The auxiliary balls 1561 are disposed in an accommodation recess 1511 of the fixed base 151, and the pyramidal recess 1562 is recessed from a surface of the rotatable holder 153 facing the fixed base 151. In this embodiment, the pyramidal recess 1562 is a square based pyramidal recess having four lateral surfaces. Furthermore, the spherical supporting structure 155 has two spherical surfaces 1551 and 1552 respectively facing the fixed base 151 and the rotatable holder 153. The spherical surface 1551 facing the fixed base 151 has three contact points with the auxiliary balls 1561, and the spherical surface 1551 and the auxiliary balls 1561 abut against each other at the three contact points. The spherical surface 1552 facing the rotatable holder 153 has four contact points with the pyramidal recess 1562, and the spherical surface 1552 abuts against the pyramidal recess 1562 at the four contact points.

In this embodiment, the three auxiliary balls 1561 of the auxiliary supporting structure 156 include three convex surfaces, and the spherical surface 1551 of the spherical supporting structure 155 facing the fixed base 151 has three contact points with the three convex surfaces.

In this embodiment, the two spherical surfaces 1551 and 1552 of the spherical supporting structure 155 have a total of seven contact points with the auxiliary supporting structure 156.

In this embodiment, the elastic element 152 surrounds the spherical supporting structure 155, and the elastic element 152 provides a preload force to the rotatable holder 153 in a direction perpendicular to the reflecting surface 1541 and towards the fixed base 151, such that the spherical supporting structure 155 supports the rotatable holder 153.

The second printed circuit board 157 is disposed on the fixed base 151. The image stabilizing actuator 158 includes four driving magnets 1581 and four driving coils 1582. The driving coils 1582 are disposed on the second printed circuit board 157, and the driving magnets 1581 are disposed on the rotatable holder 153. The second printed circuit board 157 can provide driving current for the driving coils 1582. The driving coils 1582 respectively face the driving magnets 1581 in a direction perpendicular to the reflecting surface 1541 so as to provide the rotatable holder 153 with at least two axial rotation driving forces and drive the rotatable holder 153 to rotate by taking the spherical supporting structure 155 as a rotation center, such that the reflecting element 154 can be rotated with the rotatable holder 153. In addition, the rotatable holder 153 can pitch and yaw; that is, the rotatable holder 153 can rotate in pitch DP and yaw DY.

In this embodiment, the spherical supporting structure 155 is made of ferromagnetic material, such that the spherical supporting structure 155 can be attracted to the rotatable holder 153 by magnetic force. In addition, there is no relative displacement between the spherical supporting structure 155 and the fixed base 151.

The two position sensing elements 159 are respectively disposed in two spaces respectively surrounded by adjacent two of the driving coils 1582. The position sensing elements 159 and adjacent two of the driving magnets 1581 respectively face each other in a direction perpendicular to the reflecting surface 1541, and the position sensing elements 159 are configured to detect a position of the rotatable holder 153.

The first printed circuit board 16 is disposed on the frame body 12. The auto focus driver unit 17 is disposed in the accommodating space SP, and at least a part of the auto focus driver unit 17 is disposed on the imaging lens module 13 so as to drive the imaging lens module 13 to move in a direction DA parallel to an optical axis OA thereof. Specifically, the auto focus driver unit 17 includes a plurality of rollable elements 171, a focusing coil 172 and a focusing magnet 173. The rollable elements 171 are rollably disposed in guiding grooves 121 of the frame body 12, respectively, and clamped between the lens holder 132 and the frame body 12. The focusing coil 172 is disposed on the first printed circuit board 16, and the focusing magnet 173 is fixed to the lens holder 132. The first printed circuit board 16 can provide driving current for the focusing coil 172. The focusing coil 172 and the focusing magnet 173 face each other in a direction perpendicular to the optical axis OA. The focusing coil 172 and the focusing magnet 173 are configured to provide a driving force to move the imaging lens module 13, and the imaging lens module 13 is movable in the direction DA parallel to the optical axis OA with the collaboration of the rollable elements 171.

In this embodiment, the first printed circuit board 16 and the second printed circuit board 157 are two connected boards of a single printed circuit board, and the image stabilizing actuator 158 and the auto focus driver unit 17 are driven to work by the same printed circuit board, but the present disclosure is not limited thereto.

When a curvature radius of the spherical supporting structure 155 is R, and a minimum distance between the spherical supporting structure 155 and the reflecting surface 1541 is D, the following conditions are satisfied: R=0.45 mm; D=0.3 mm; and R/D=1.5.

2nd Embodiment

Figure 8:
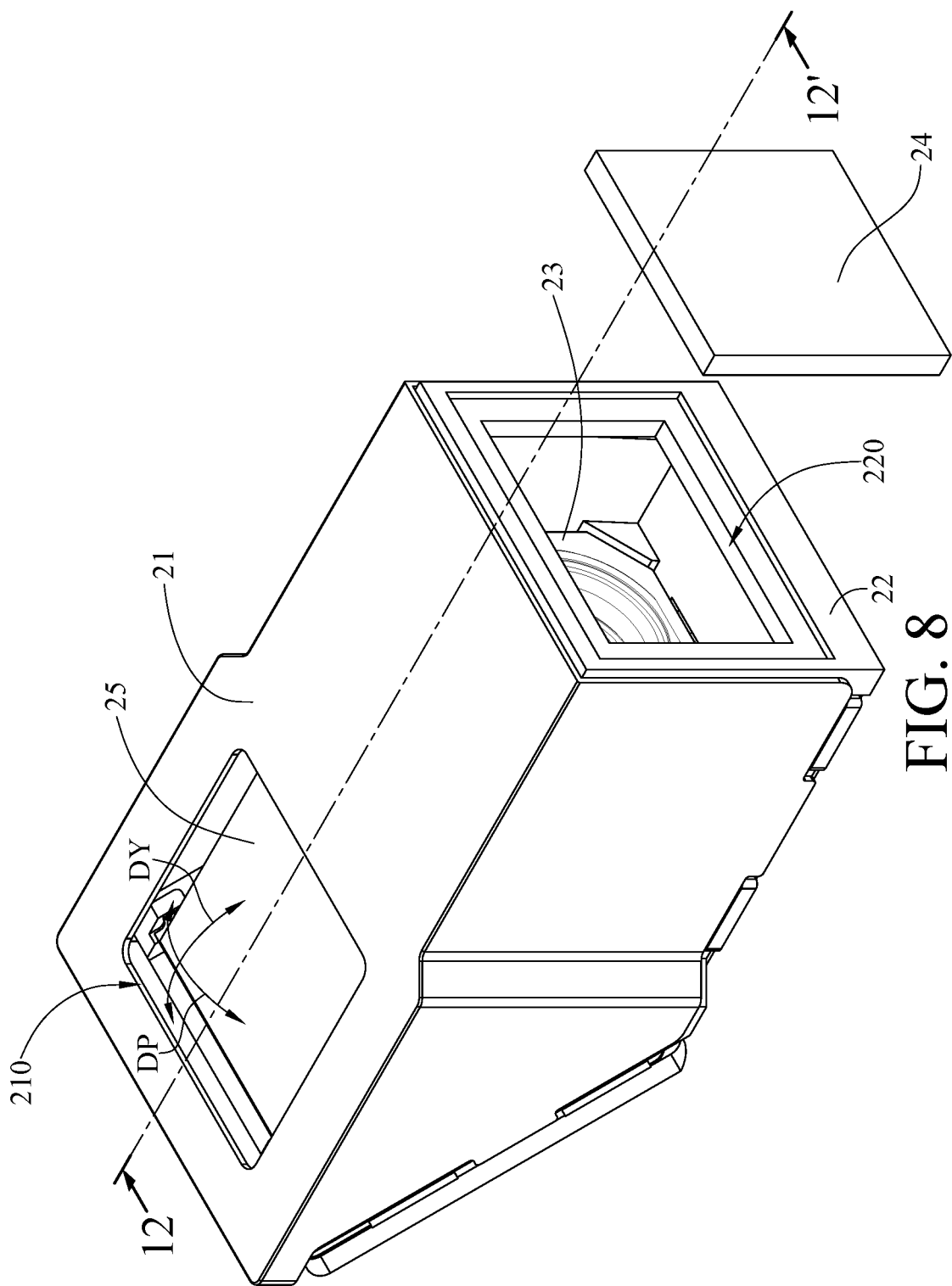
FIG. 8 is a perspective view of a camera module according to the 2nd embodiment of the present disclosure.
Figure 9:
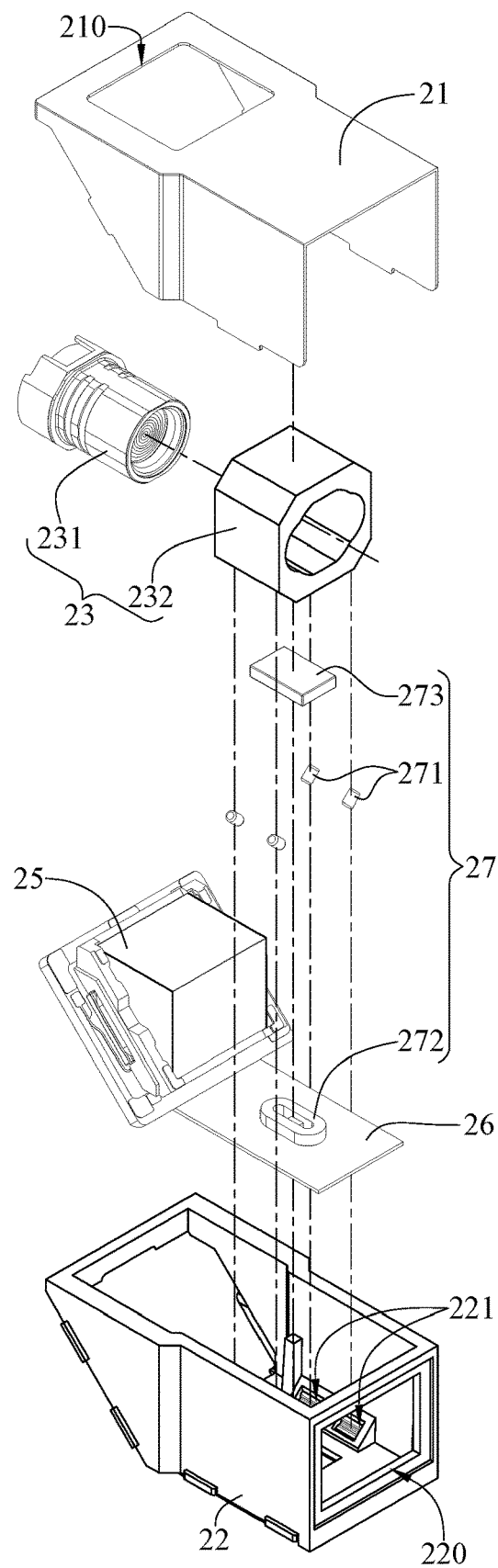
FIG. 9 is a partially exploded view of the camera module in FIG. 8.
Figure 10:
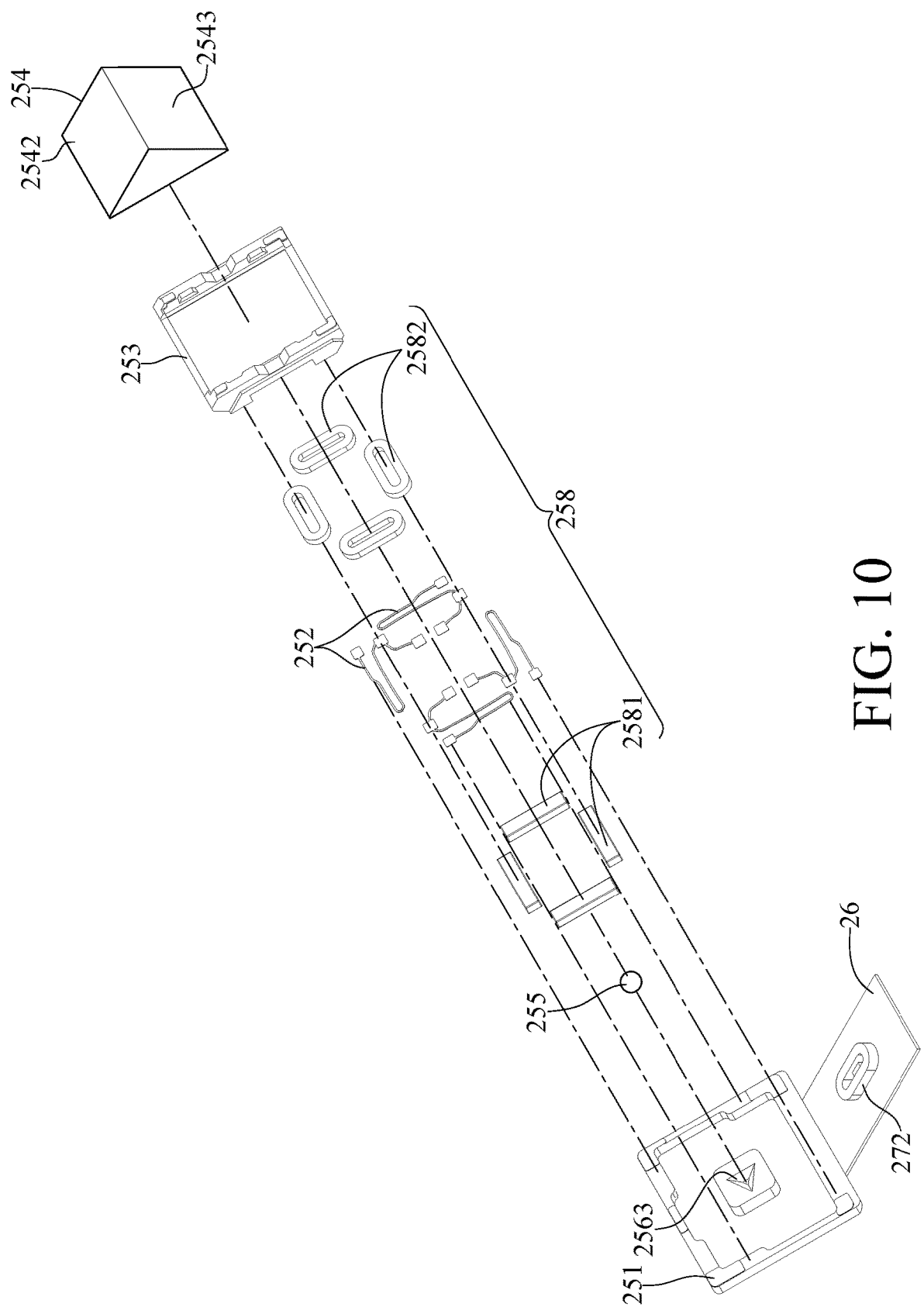
FIG. 10 is an exploded view of some components of the camera module in FIG. 8.
Figure 11:
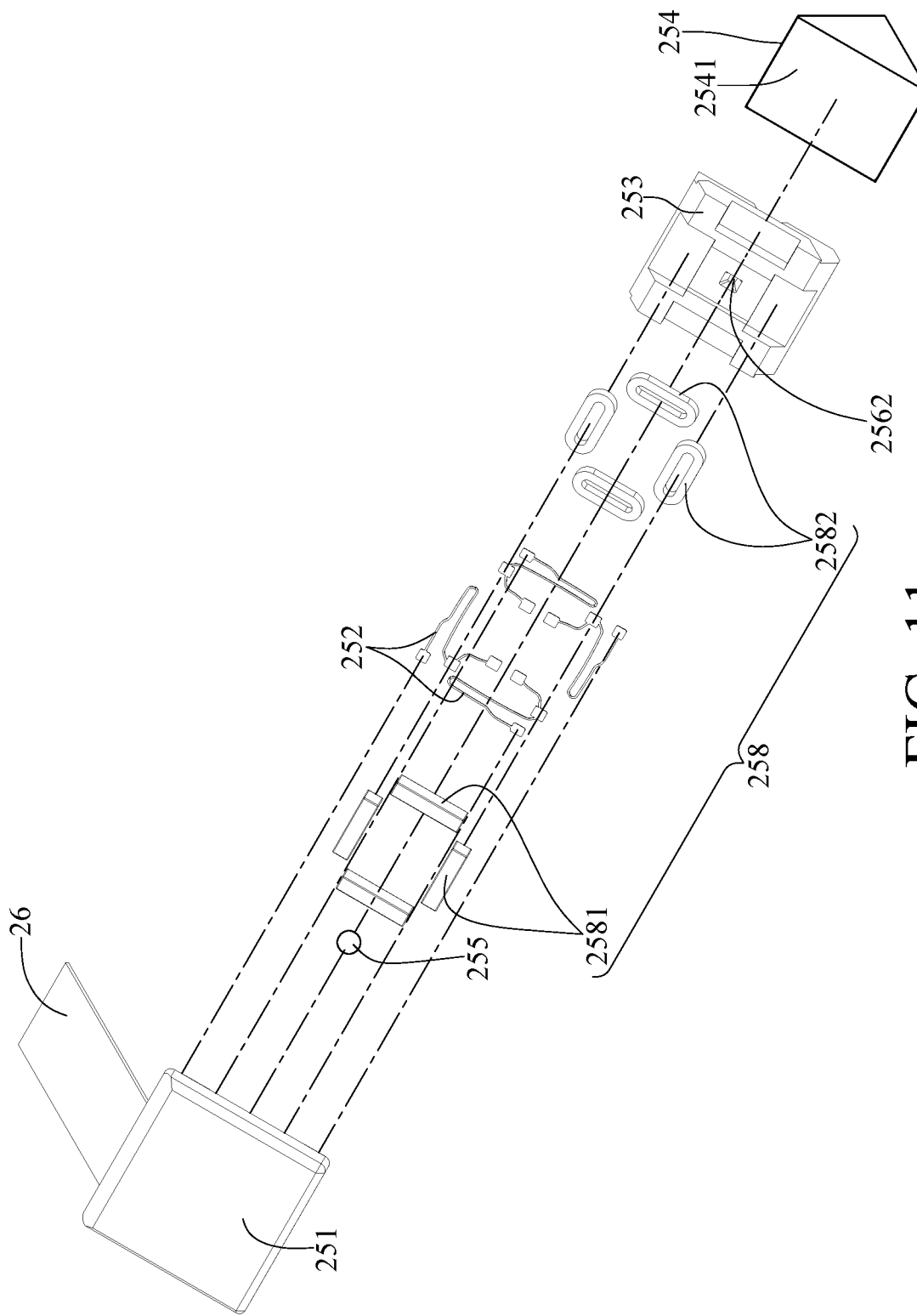
FIG. 11 is another exploded view of some components of the camera module in FIG. 8.
Figure 12:
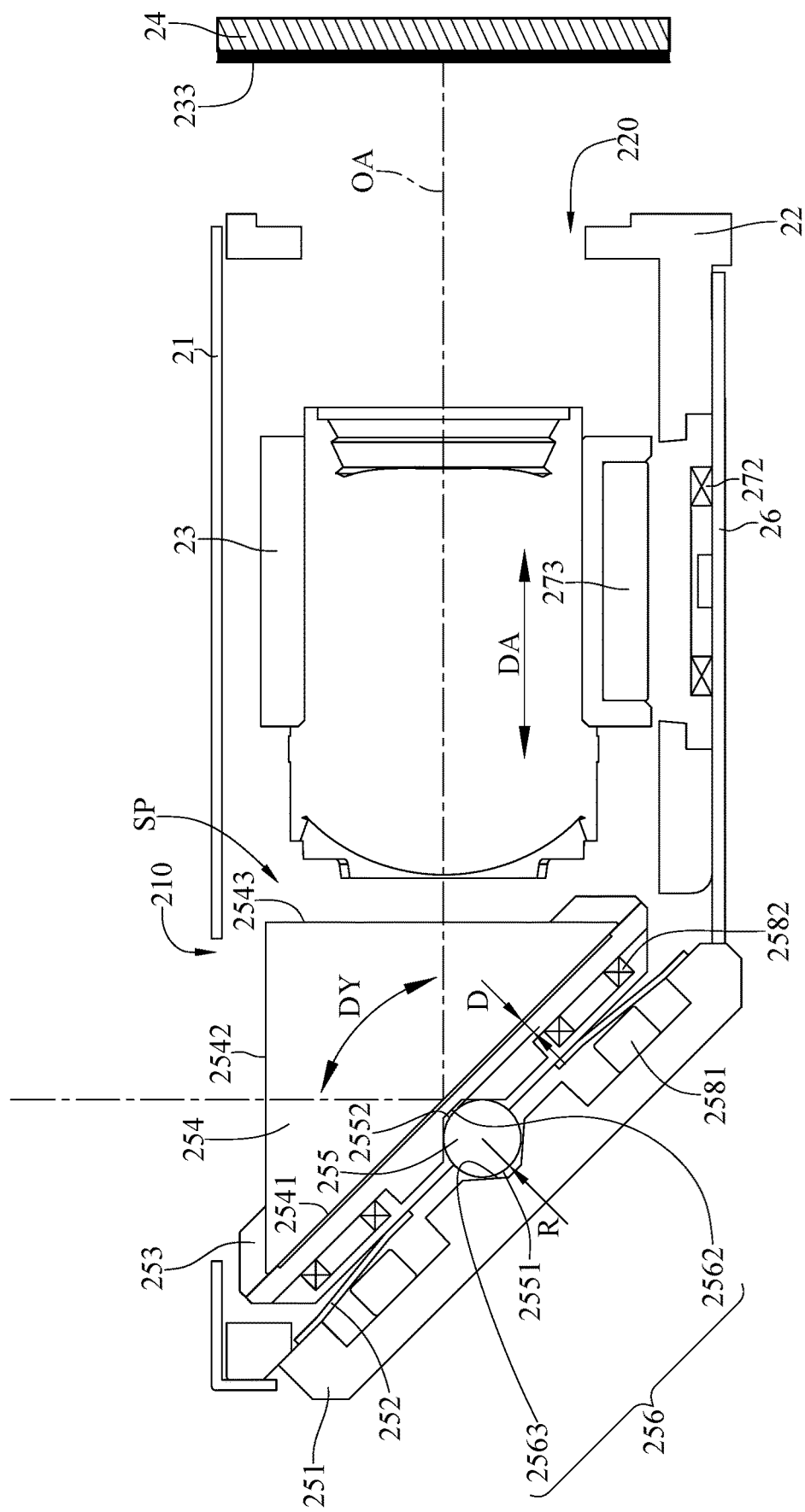
FIG. 12 is a cross-sectional view of the camera module along line 12-12' in FIG. 8.
Figure 14:
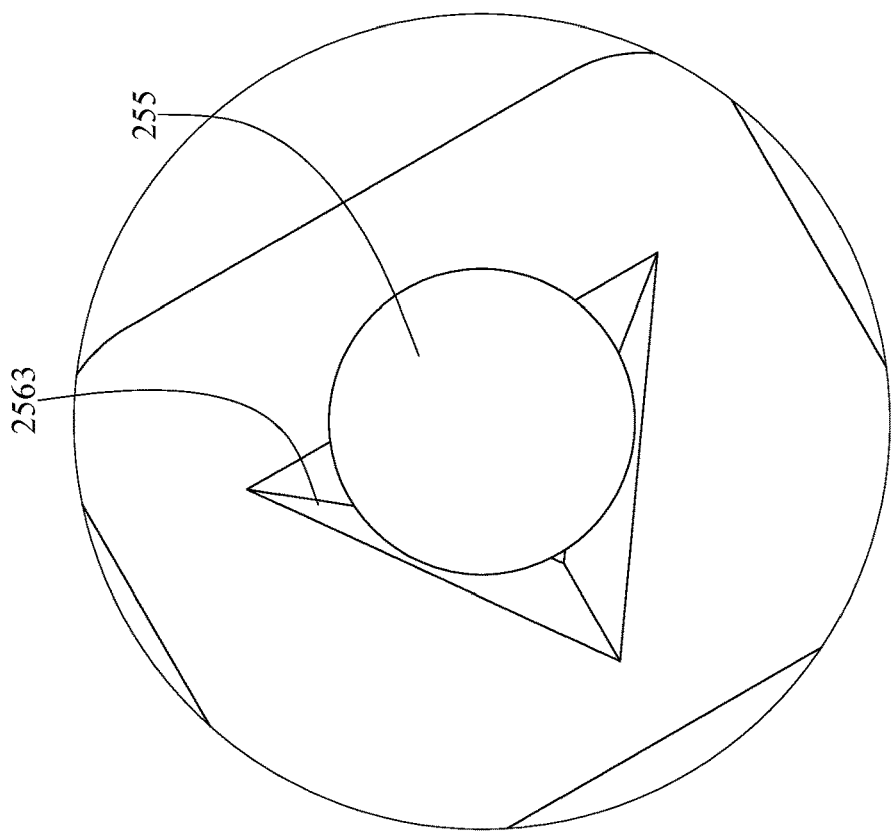
FIG. 14 is an enlarged view of region B of FIG. 13.
Figure 13:
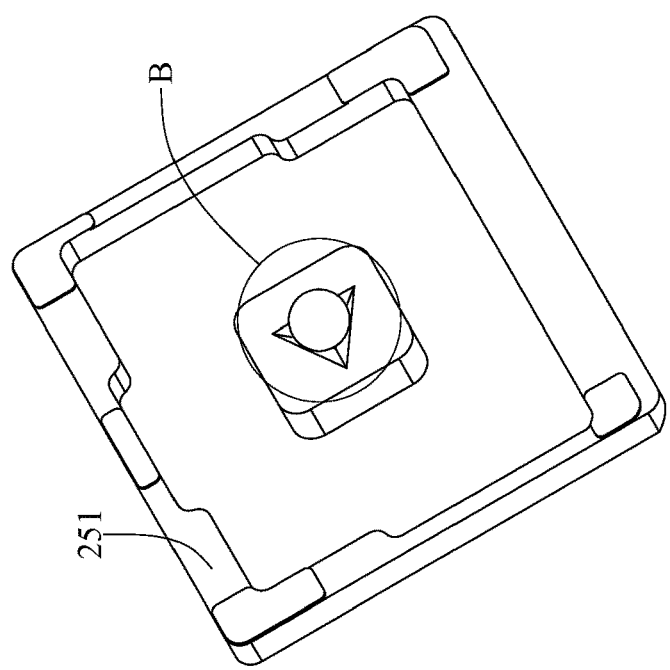
FIG. 13 is a perspective view of a fixed base, a spherical supporting structure and an auxiliary supporting structure in FIG. 10.

Please refer to FIG. 8 to FIG. 14, where FIG. 8 is a perspective view of a camera module according to the 2nd embodiment of the present disclosure, FIG. 9 is a partially exploded view of the camera module in FIG. 8, FIG. 10 is an exploded view of some components of the camera module in FIG. 8, FIG. 11 is another exploded view of some components of the camera module in FIG. 8, FIG. 12 is a cross-sectional view of the camera module along line 12-12' in FIG. 8, FIG. 13 is a perspective view of a fixed base, a spherical supporting structure and an auxiliary supporting structure in FIG. 10, and FIG. 14 is an enlarged view of region B of FIG. 13.

In this embodiment, a camera module 20 includes a casing 21, a frame body 22, an imaging lens module 23, an image sensor 24, a reflection module capable of image stabilization 25, a printed circuit board 26 and an auto focus driver unit 27.

The casing 21 is disposed on the frame body 22, and the casing 21 and the frame body 22 together form an accommodating space SP. The casing 21 has an aperture 210 for light entering, and the frame body 22 has an opening 220 for light exiting.

The imaging lens module 23 is disposed in the accommodating space SP, and the imaging lens module 23 includes an imaging lens assembly 231 and a lens holder 232 for holding the imaging lens assembly 231. In addition, the lens holder 232 is movably disposed in the accommodating space SP.

The image sensor 24 is disposed on an image surface 233 of the imaging lens module 23, and the reflection module 25 is disposed in the accommodating space SP and located on an object side of the imaging lens module 23. The reflection module 25 is configured to stabilize the image signal captured by the image sensor 24.

The reflection module 25 includes a fixed base 251, a plurality of elastic elements 252, a rotatable holder 253, a reflecting element 254, a spherical supporting structure 255, an auxiliary supporting structure 256 and an image stabilizing actuator 258.

The fixed base 251 is disposed on the frame body 22, and the rotatable holder 253 is connected to the fixed base 251 via the elastic elements 252.

The reflecting element 254 is a plastic prism manufactured by injection molding, and the reflecting element 254 is disposed on the rotatable holder 253. The reflecting element 254 and the fixed base 251 are located on two opposite sides of the rotatable holder 253. The reflecting element 254 has a reflecting surface 2541, a light entrance surface 2542 and a light exit surface 2543. The reflecting surface 2541 is configured to fold an optical path of incident light. The light entrance surface 2542 is disposed corresponding to the reflecting surface 2541, and the light exit surface 2543 is disposed corresponding to the reflecting surface 2541. The light entrance surface 2542 faces toward the aperture 210 of the casing 21, and the light exit surface 2543 faces toward the imaging lens module 23. As such, incident light passes through, in order from the object side to the image side along the optical path, the light entrance surface 2542, the reflecting surface 2541 and the light exit surface 2543.

The spherical supporting structure 255 is a ball disposed between the rotatable holder 253 and the fixed base 251. The auxiliary supporting structure 256 includes a first pyramidal recess 2563 and a second pyramidal recess 2562 corresponding and configured to support the spherical supporting structure 255. The first pyramidal recess 2563 is recessed from a surface of the fixed base 251 facing the rotatable holder 253, and the second pyramidal recess 2562 is recessed from a surface of the rotatable holder 253 facing the fixed base 251. In this embodiment, the first pyramidal recess 2563 is a triangular based pyramidal recess having three lateral surfaces, and the second pyramidal recess 2562 is a square based pyramidal recess having four lateral surfaces. Furthermore, the spherical supporting structure 255 has two spherical surfaces 2551 and 2552 respectively facing the fixed base 251 and the rotatable holder 253. The spherical surface 2551 facing the fixed base 251 has three contact points with the first pyramidal recess 2563, and the spherical surface 2551 abuts against the first pyramidal recess 2563 at the three contact points. The spherical surface 2552 facing the rotatable holder 253 has four contact points with the second pyramidal recess 2562, and the spherical surface 2552 abuts against the second pyramidal recess 2562 at the four contact points.

In this embodiment, the spherical surfaces 2551 and 2552 of the spherical supporting structure 255 have a total of seven contact points with the auxiliary supporting structure 256.

In this embodiment, the number of the elastic elements 252 is four, and the elastic elements 252 together surround the spherical supporting structure 255. The elastic elements 252 provides a preload force to the rotatable holder 253 in a direction perpendicular to the reflecting surface 2541 and towards the fixed base 251, such that the spherical supporting structure 255 supports the rotatable holder 253.

The image stabilizing actuator 258 includes four driving magnets 2581 and four driving coils 2582. In this embodiment, the driving magnets 2581 are disposed on the fixed base 251, and the driving coils 2582 are disposed on the rotatable holder 253. The driving coils 2582 respectively face the driving magnets 2581 in a direction perpendicular to the reflecting surface 2541 so as to provide the rotatable holder 253 with at least two axial rotation driving forces and drive the rotatable holder 253 to rotate by taking the spherical supporting structure 255 as a rotation center, such that the reflecting element 254 can be rotated with the rotatable holder 253. In addition, the rotatable holder 253 can pitch and yaw; that is, the rotatable holder 253 can rotate in pitch DP and yaw DY.

In this embodiment, the spherical supporting structure 255 is made of ferromagnetic material, such that the spherical supporting structure 255 can be attracted to the rotatable holder 253 and the fixed base 251 by magnetic force. In addition, there is no relative displacement between the spherical supporting structure 255 and the fixed base 251.

The printed circuit board 26 is connected to the fixed base 251. The auto focus driver unit 27 is disposed in the accommodating space SP, and at least a part of the auto focus driver unit 27 is disposed on the imaging lens module 23 so as to drive the imaging lens module 23 to move in a direction DA parallel to an optical axis OA thereof. Specifically, the auto focus driver unit 27 includes a plurality of rollable elements 271, a focusing coil 272 and a focusing magnet 273. The rollable elements 271 are rollably disposed in guiding grooves 221 of the frame body 22, respectively, and clamped between the lens holder 232 and the frame body 22. The focusing coil 272 is disposed on the printed circuit board 26, and the focusing magnet 273 is fixed to the lens holder 232. The printed circuit board 26 can provide driving current for the focusing coil 272. The focusing coil 272 and the focusing magnet 273 face each other in a direction perpendicular to the optical axis OA. The focusing coil 272 and the focusing magnet 273 are configured to provide a driving force to move the imaging lens module 23, and the imaging lens module 23 is movable in the direction DA parallel to the optical axis OA with the collaboration of the rollable elements 271.

When a curvature radius of the spherical supporting structure 255 is R, and a minimum distance between the spherical supporting structure 255 and the reflecting surface 2541 is D, the following conditions are satisfied: R=0.6 mm; D=0.25 mm; and R/D=2.4.

3rd Embodiment

Figure 15:
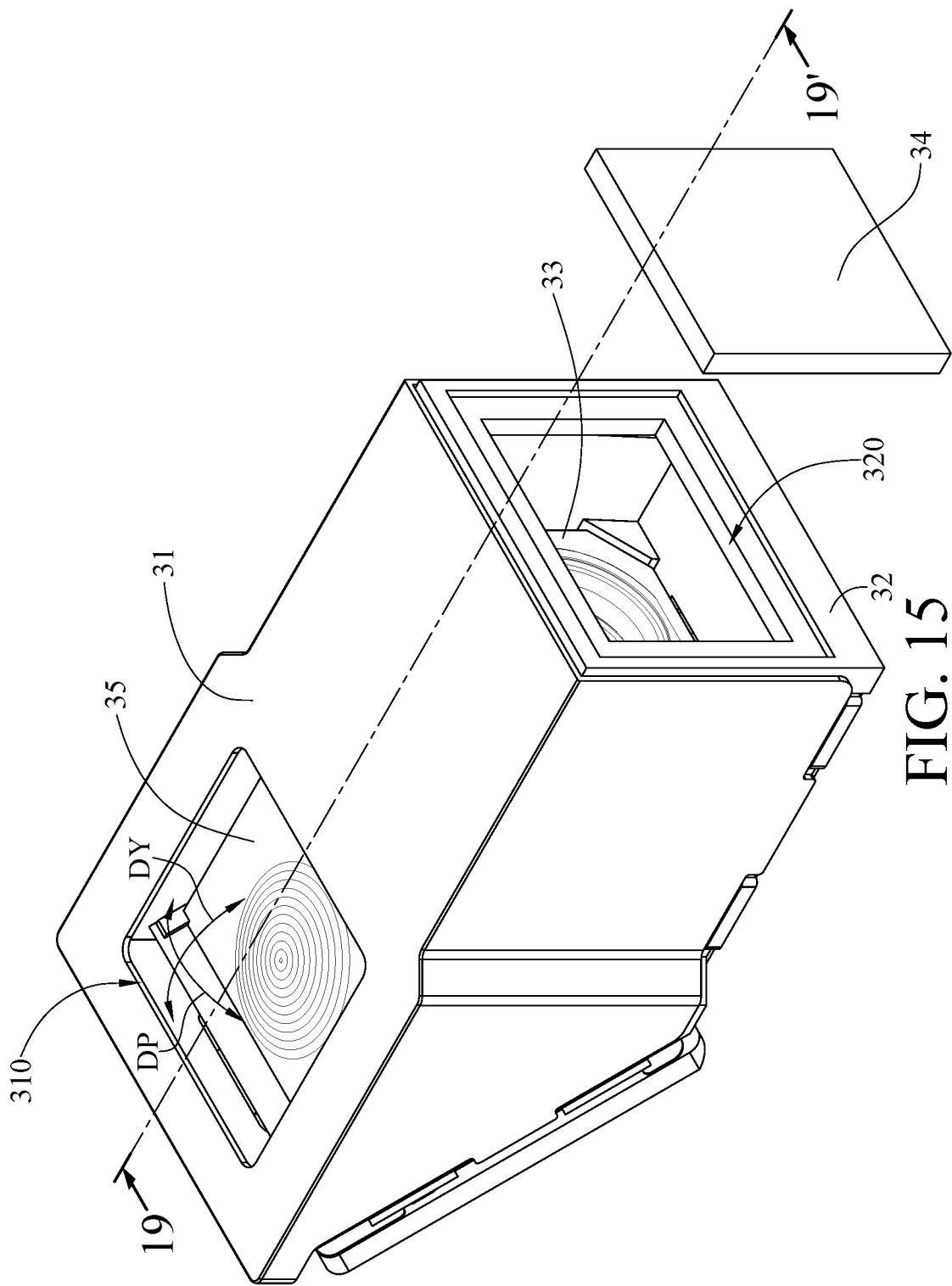
FIG. 15 is a perspective view of a camera module according to the 3rd embodiment of the present disclosure.
Figure 16:
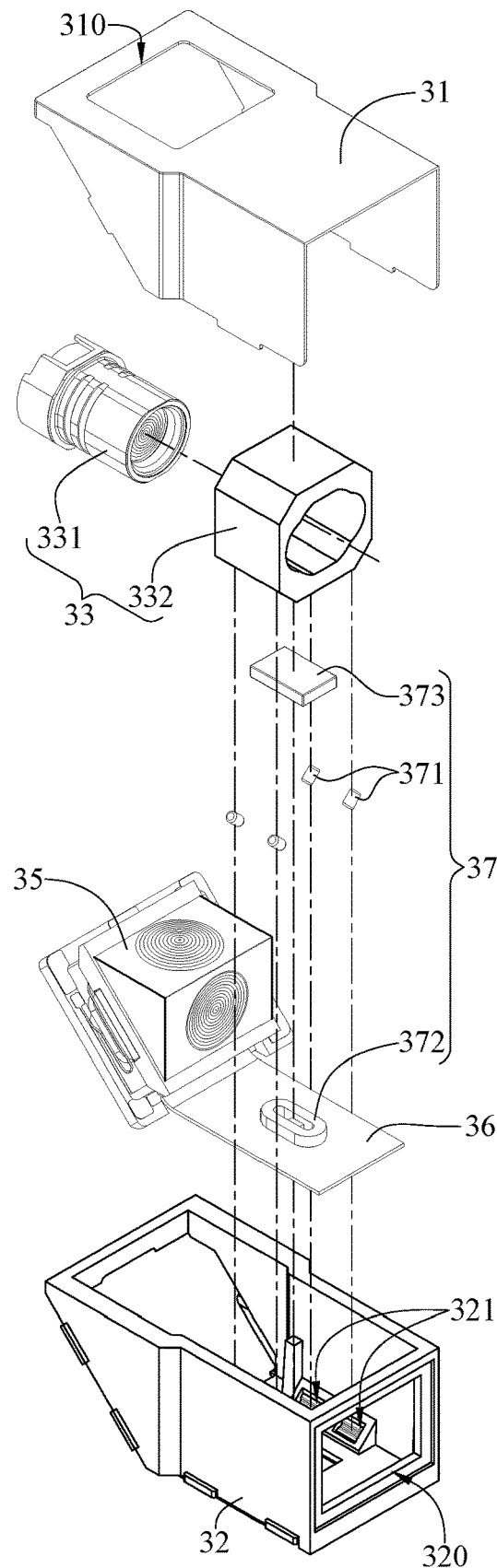
FIG. 16 is a partially exploded view of the camera module in FIG. 15.
Figure 17:
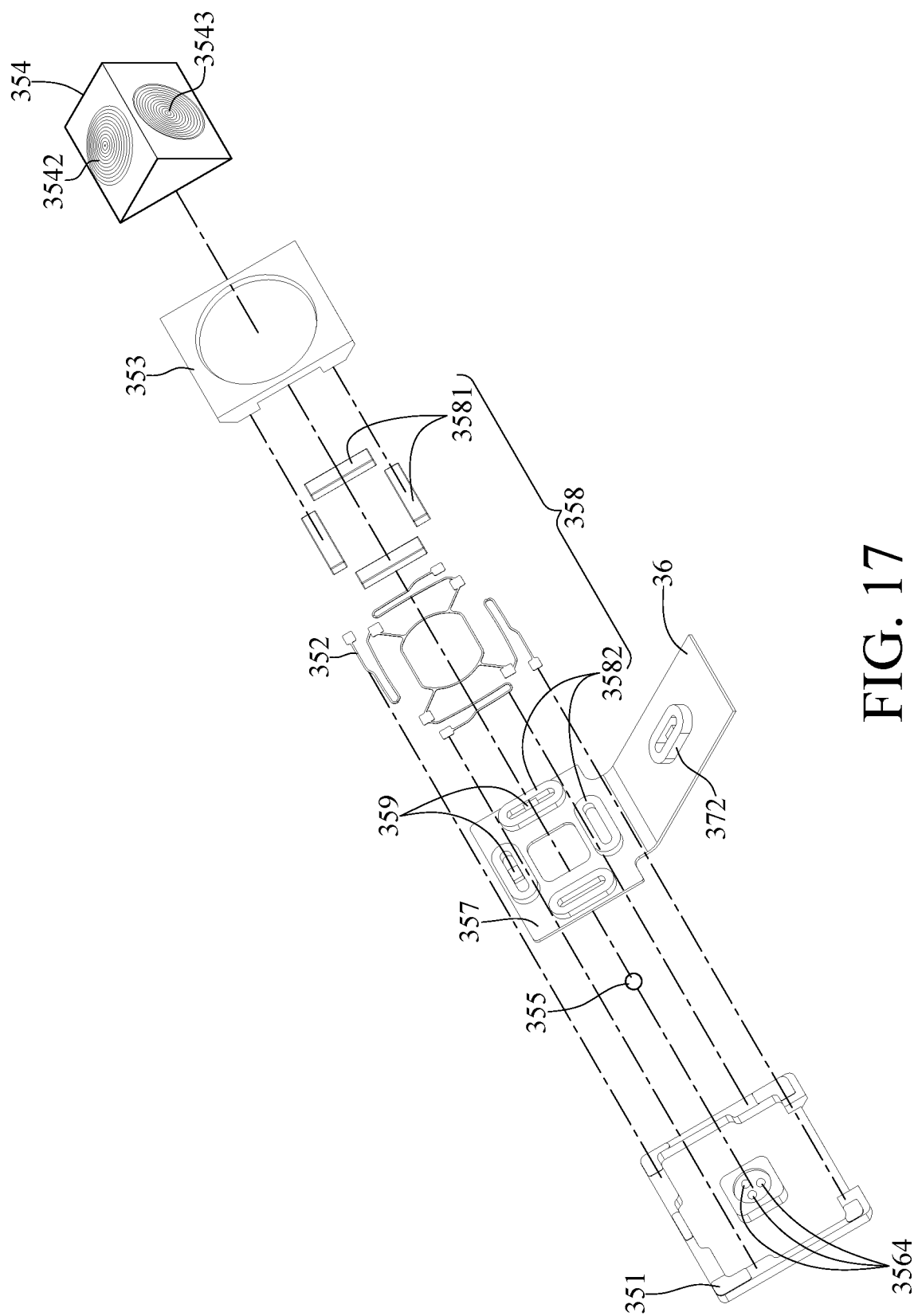
FIG. 17 is an exploded view of some components of the camera module in FIG. 15.
Figure 18:
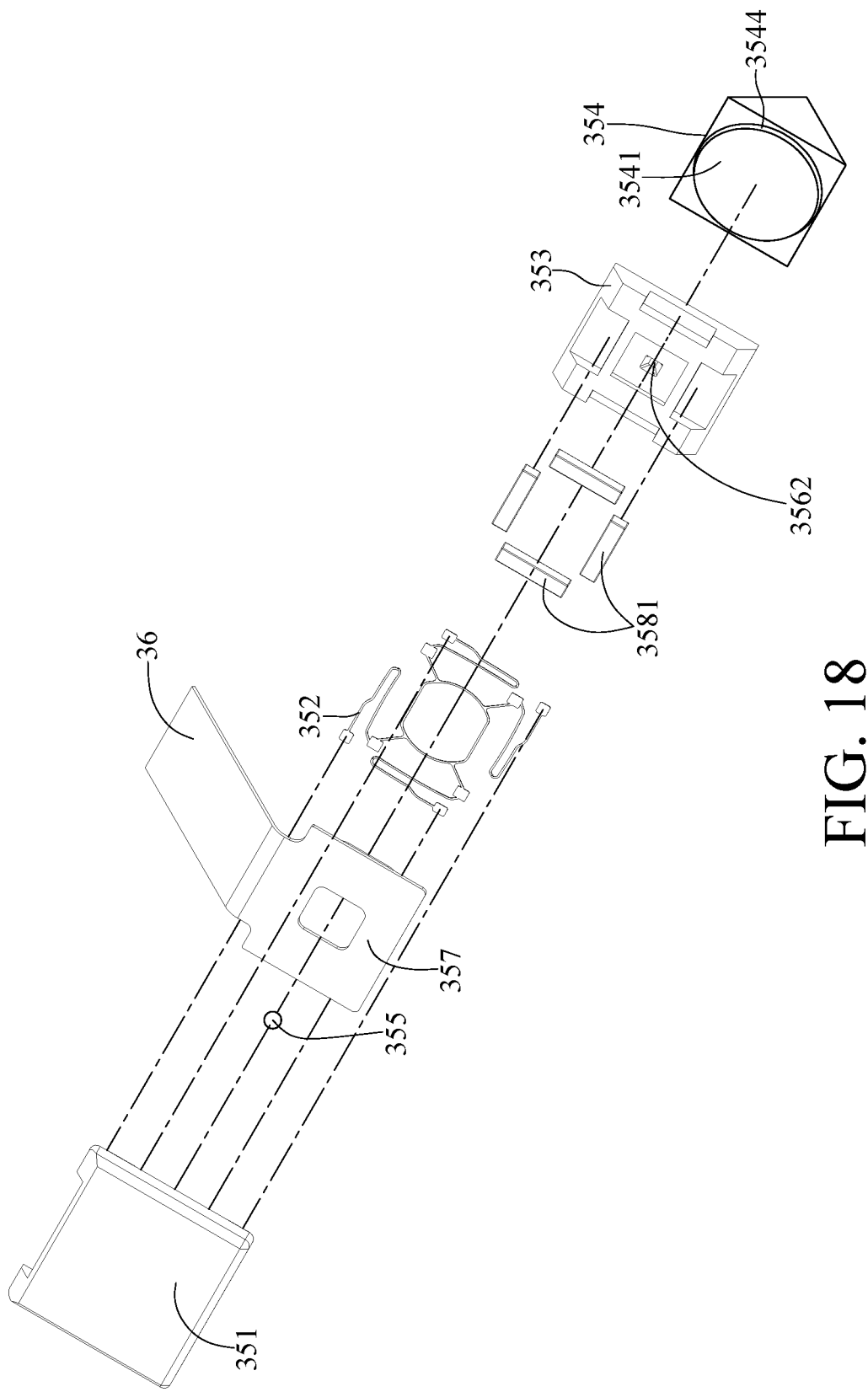
FIG. 18 is another exploded view of some components of the camera module in FIG. 15.
Figure 19:
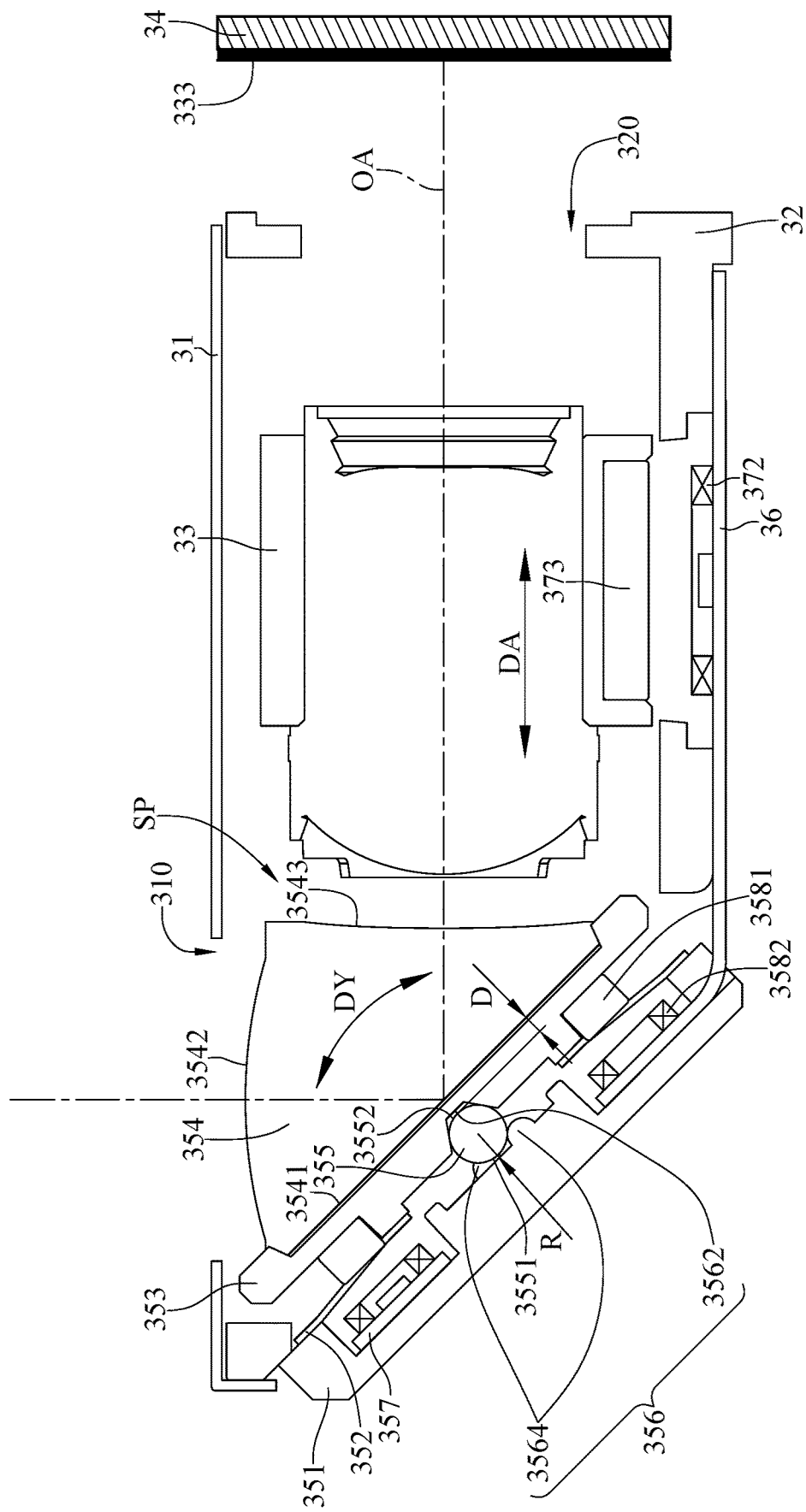
FIG. 19 is a cross-sectional view of the camera module along line 19-19' in FIG. 15.
Figure 21:
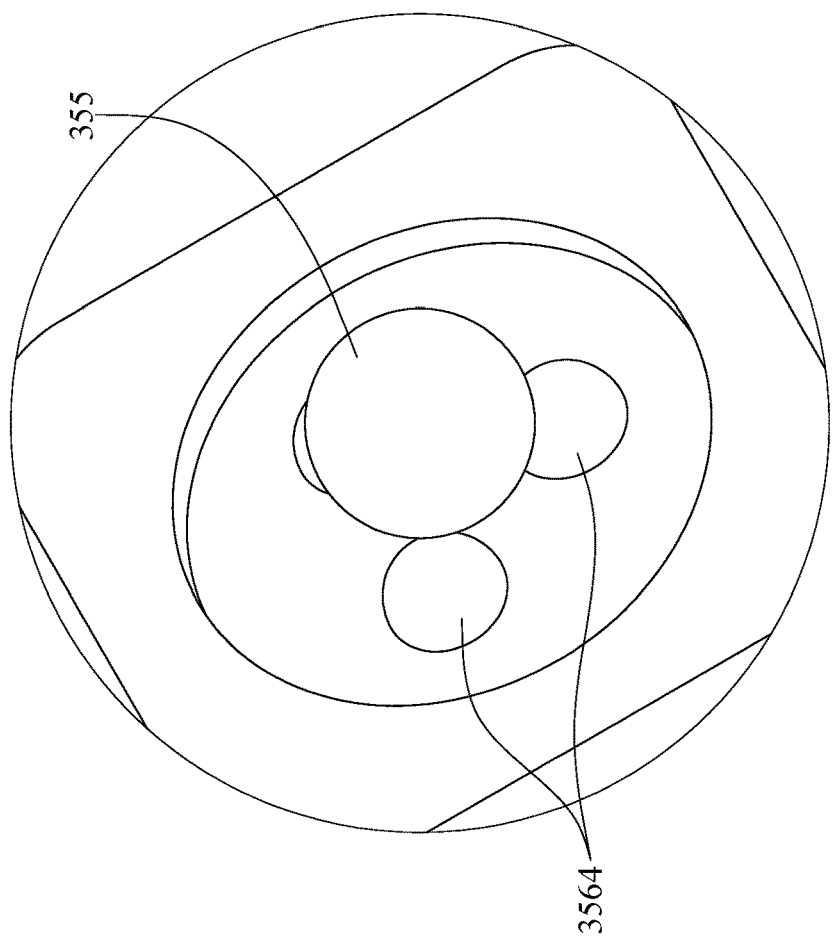
FIG. 21 is an enlarged view of region C of FIG. 20.
Figure 20:
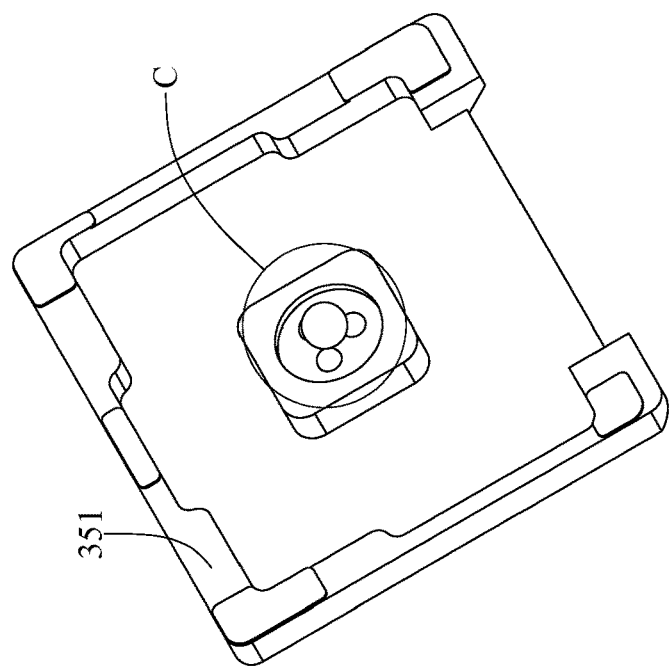
FIG. 20 is a perspective view of a fixed base, a spherical supporting structure and an auxiliary supporting structure in FIG. 17.

Please refer to FIG. 15 to FIG. 21, where FIG. 15 is a perspective view of a camera module according to the 3rd embodiment of the present disclosure, FIG. 16 is a partially exploded view of the camera module in FIG. 15, FIG. 17 is an exploded view of some components of the camera module in FIG. 15, FIG. 18 is another exploded view of some components of the camera module in FIG. 15, FIG. 19 is a cross-sectional view of the camera module along line 19-19' in FIG. 15, FIG. 20 is a perspective view of a fixed base, a spherical supporting structure and an auxiliary supporting structure in FIG. 17, and FIG. 21 is an enlarged view of region C of FIG. 20.

In this embodiment, a camera module 30 includes a casing 31, a frame body 32, an imaging lens module 33, an image sensor 34, a reflection module capable of image stabilization 35, a first printed circuit board 36 and an auto focus driver unit 37.

The casing 31 is disposed on the frame body 32, and the casing 31 and the frame body 32 together form an accommodating space SP. The casing 31 has an aperture 310 for light entering, and the frame body 32 has an opening 320 for light exiting.

The imaging lens module 33 is disposed in the accommodating space SP, and the imaging lens module 33 includes an imaging lens assembly 331 and a lens holder 332 for holding the imaging lens assembly 331. In addition, the lens holder 332 is movably disposed in the accommodating space SP.

The image sensor 34 is disposed on an image surface 333 of the imaging lens module 33, and the reflection module 35 is disposed in the accommodating space SP and located on an object side of the imaging lens module 33. The reflection module 35 is configured to stabilize the image signal captured by the image sensor 34.

The reflection module 35 includes a fixed base 351, an elastic element 352, a rotatable holder 353, a reflecting element 354, a spherical supporting structure 355, an auxiliary supporting structure 356, a second printed circuit board 357, an image stabilizing actuator 358 and two position sensing elements 359.

The fixed base 351 is disposed on the frame body 32, and the rotatable holder 353 is connected to the fixed base 351 via the elastic element 352.

The reflecting element 354 is a plastic prism manufactured by injection molding, and the reflecting element 354 is disposed on the rotatable holder 353. The reflecting element 354 and the fixed base 351 are located on two opposite sides of the rotatable holder 353. The reflecting element 354 has a reflecting surface 3541, a light entrance surface 3542 and a light exit surface 3543. The reflecting surface 3541 is configured to fold an optical path of incident light. The light entrance surface 3542 is disposed corresponding to the reflecting surface 3541, and the light exit surface 3543 is disposed corresponding to the reflecting surface 3541. The light entrance surface 3542 faces toward the aperture 310 of the casing 31, and the light exit surface 3543 faces toward the imaging lens module 33. As such, incident light passes through, in order from the object side to the image side along the optical path, the light entrance surface 3542, the reflecting surface 3541 and the light exit surface 3543. In this embodiment, each of the light entrance surface 3542 and the light exit surface 3543 has an optical aspheric surface, such that the reflecting element 354 has light refractive power capable of providing better optical resolving power.

The spherical supporting structure 355 is a ball disposed between the rotatable holder 353 and the fixed base 351. The auxiliary supporting structure 356 includes three spherical protrusions 3564 and a pyramidal recess 3562 corresponding and configured to support the spherical supporting structure 355. The spherical protrusions 3564 are formed on a surface of the fixed base 351 facing the rotatable holder 353, and the pyramidal recess 3562 is recessed from a surface of the rotatable holder 353 facing the fixed base 351. In this embodiment, the pyramidal recess 3562 is a square based pyramidal recess having four lateral surfaces. Furthermore, the spherical supporting structure 355 has two spherical surfaces 3551 and 3552 respectively facing the fixed base 351 and the rotatable holder 353. The spherical surface 3551 facing the fixed base 351 has three contact points with the spherical protrusions 3564, and the spherical surface 3551 and the spherical protrusions 3564 abut against each other at the three contact points. The spherical surface 3552 facing the rotatable holder 353 has four contact points with the pyramidal recess 3562, and the spherical surface 3552 abuts against the pyramidal recess 3562 at the four contact points.

In this embodiment, the three spherical protrusions 3564 of the auxiliary supporting structure 356 include three convex surfaces, and the spherical surface 3551 of the spherical supporting structure 355 facing the fixed base 351 has three contact points with the three convex surfaces.

In this embodiment, the two spherical surfaces 3551 and 3552 of the spherical supporting structure 355 have a total of seven contact points with the auxiliary supporting structure 356.

In this embodiment, the elastic element 352 surrounds the spherical supporting structure 355, and the elastic element 352 provides a preload force to the rotatable holder 353 in a direction perpendicular to the reflecting surface 3541 and towards the fixed base 351, such that the spherical supporting structure 355 supports the rotatable holder 353.

The second printed circuit board 357 is disposed on the fixed base 351. The image stabilizing actuator 358 includes four driving magnets 3581 and four driving coils 3582. The driving magnets 3581 are disposed on the rotatable holder 353, and the driving coils 3582 are disposed on the second printed circuit board 357. The second printed circuit board 357 can provide driving current for the driving coils 3582. The driving coils 3582 respectively face the driving magnets 3581 in a direction perpendicular to the reflecting surface 3541 so as to provide the rotatable holder 353 with at least two axial rotation driving forces and drive the rotatable holder 353 to rotate by taking the spherical supporting structure 355 as a rotation center, such that the reflecting element 354 can be rotated with the rotatable holder 353. In addition, the rotatable holder 353 can pitch and yaw; that is, the rotatable holder 353 can rotate in pitch DP and yaw DY.

In this embodiment, the spherical supporting structure 355 is made of ferromagnetic material, such that the spherical supporting structure 355 can be attracted to the rotatable holder 353 by magnetic force. In addition, there is no relative displacement between the spherical supporting structure 355 and the fixed base 351.

The two position sensing elements 359 are respectively disposed in two spaces respectively surrounded by adjacent two of the driving coils 3582. The position sensing elements 359 and adjacent two of the driving magnets 3581 respectively face each other in a direction perpendicular to the reflecting surface 3541, and the position sensing elements 359 are configured to detect a position of the rotatable holder 353.

The first printed circuit board 36 is disposed on the frame body 32. The auto focus driver unit 37 is disposed in the accommodating space SP, and at least a part of the auto focus driver unit 37 is disposed on the imaging lens module 33 so as to drive the imaging lens module 33 to move in a direction DA parallel to an optical axis OA thereof. Specifically, the auto focus driver unit 37 includes a plurality of rollable elements 371, a focusing coil 372 and a focusing magnet 373. The rollable elements 371 are rollably disposed in guiding grooves 321 of the frame body 32, respectively, and clamped between the lens holder 332 and the frame body 32. The focusing coil 372 is disposed on the first printed circuit board 36, and the focusing magnet 373 is fixed to the lens holder 332. The first printed circuit board 36 can provide driving current for the focusing coil 372. The focusing coil 372 and the focusing magnet 373 face each other in a direction perpendicular to the optical axis OA. The focusing coil 372 and the focusing magnet 373 are configured to provide a driving force to move the imaging lens module 33, and the imaging lens module 33 is movable in the direction DA parallel to the optical axis OA with the collaboration of the rollable elements 371.

In this embodiment, the reflecting element 354 further has an engagement structure 3544 surrounding a truncated conical surface of the reflecting surface 3541. The reflecting element 354 is attached to the rotatable holder 353 by the engagement structure 3544 engaged with an engagement recess (not numbered) of the rotatable holder 353 so as to align the geometric center of the reflecting surface 3541 with the center of the spherical supporting structure 355, which can further make the light exit surface 3543 of the reflecting element 354 coaxially aligned with the optical axis OA of the imaging lens module 33.

In this embodiment, the first printed circuit board 36 and the second printed circuit board 357 are two connected boards of a single printed circuit board, and the image stabilizing actuator 358 and the auto focus driver unit 37 are driven to work by the same printed circuit board, but the present disclosure is not limited thereto.

When a curvature radius of the spherical supporting structure 355 is R, and a minimum distance between the spherical supporting structure 355 and the reflecting surface 3541 is D, the following conditions are satisfied: R=0.45 mm; D=0.3 mm; and R/D=1.5.

4th Embodiment

Figure 22:
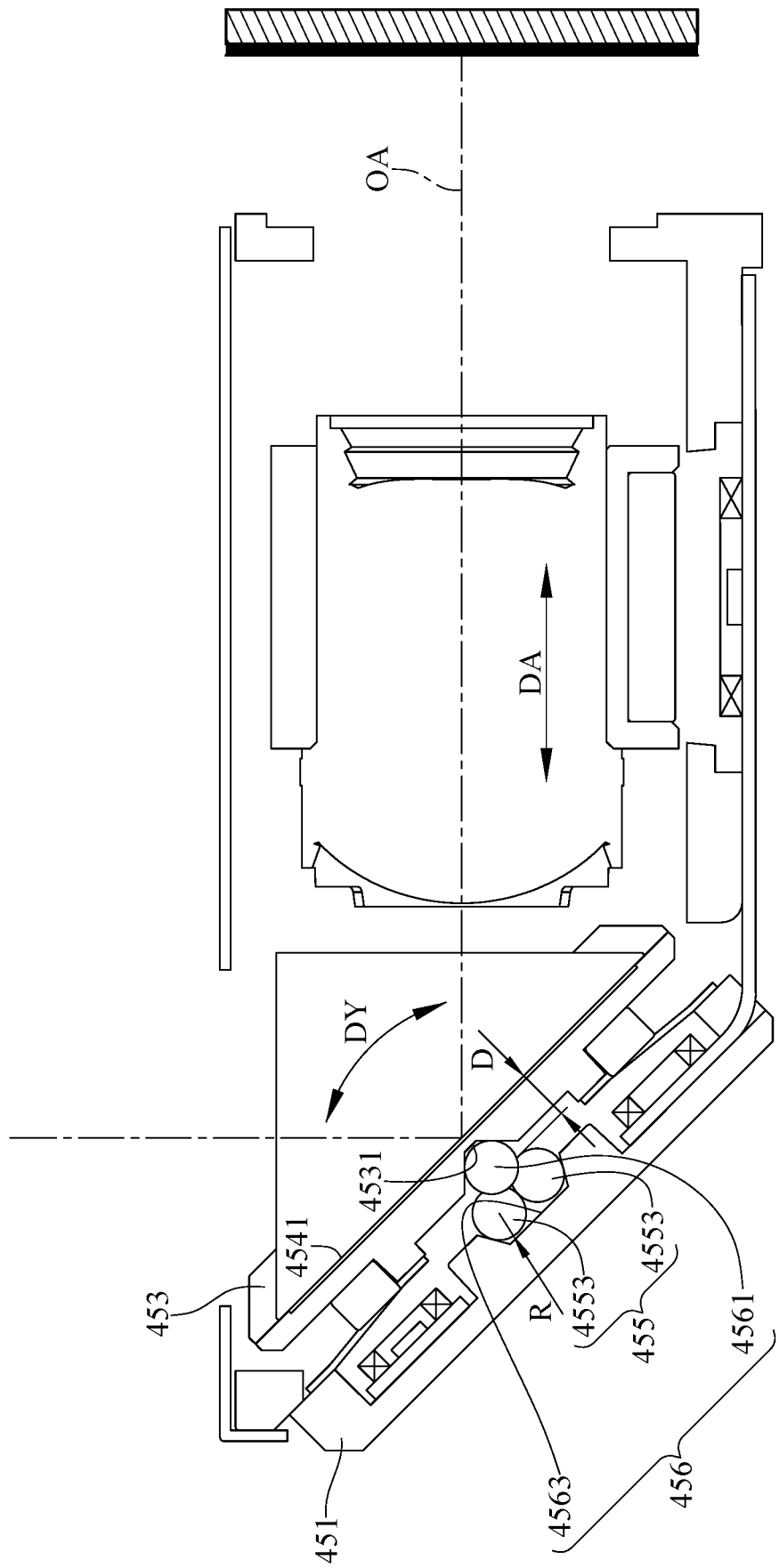
FIG. 22 is a cross-sectional view of a camera module according to the 4th embodiment of the present disclosure.
Figure 24:
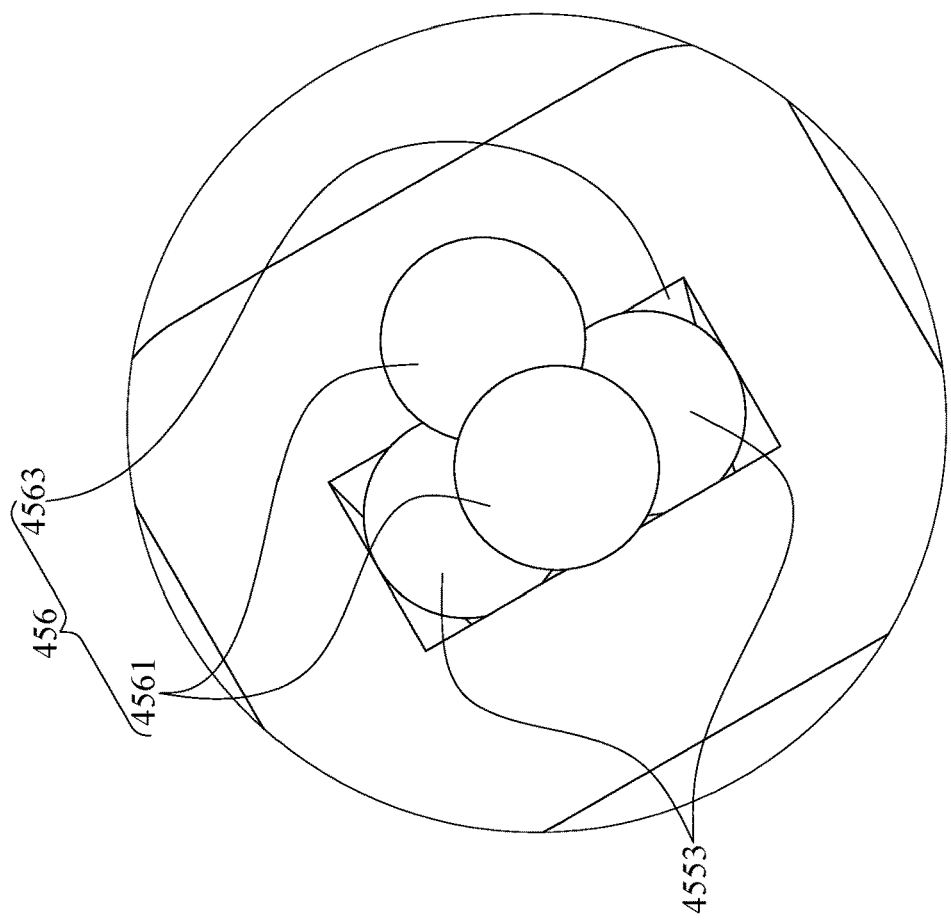
FIG. 24 is an enlarged view of region D of FIG. 23.
Figure 23:
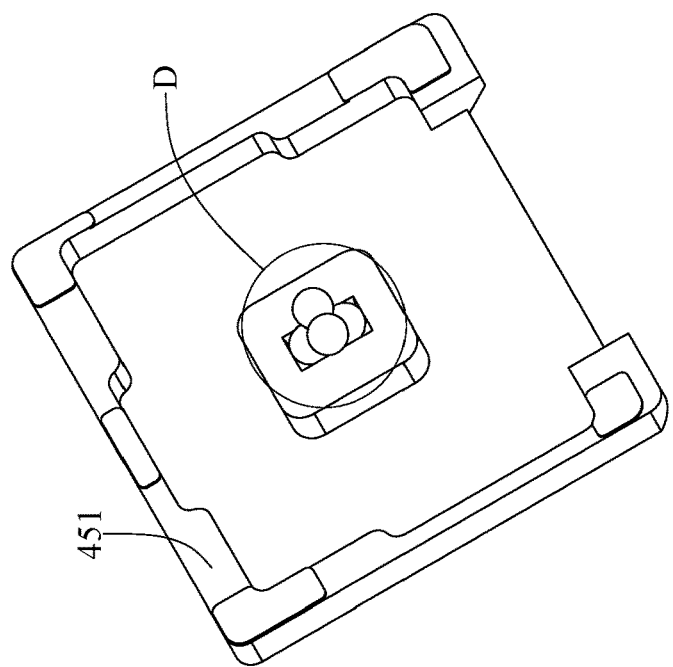
FIG. 23 is a perspective view of a fixed base, a spherical supporting structure and an auxiliary supporting structure in FIG. 22.

Please refer to FIG. 22 to FIG. 24, where FIG. 22 is a cross-sectional view of a camera module according to the 4th embodiment of the present disclosure, FIG. 23 is a perspective view of a fixed base, a spherical supporting structure and an auxiliary supporting structure in FIG. 22, and FIG. 24 is an enlarged view of region D of FIG. 23.

In this embodiment, a camera module 40 is provided, and the camera module 40 has a configuration similar to that of the camera module 10 disclosed in the 1st embodiment. The camera module 40 and the camera module 10 are different from each other in features of spherical supporting structure and auxiliary supporting structure.

In this embodiment, a spherical supporting structure 455 includes two balls 4553 disposed between a rotatable holder 453 and a fixed base 451. An auxiliary supporting structure 456 includes a pyramidal recess 4563 and two auxiliary balls 4561 corresponding and configured to support the spherical supporting structure 455. The pyramidal recess 4563 is recessed from a surface of the fixed base 451 facing the rotatable holder 453, and the auxiliary balls 4561 are disposed in an accommodation recess 4531 of the rotatable holder 453. Each of the balls 4553 of the spherical supporting structure 455 has two spherical surfaces (not numbered) respectively facing the fixed base 451 and the rotatable holder 453. Each spherical surface of the balls 4553 facing the fixed base 451 has three contact points with the pyramidal recess 4563, and each spherical surface of the balls 4553 facing the fixed base 451 abuts against the pyramidal recess 4563 at the three contact points. Each spherical surface of the balls 4553 facing the rotatable holder 453 has two contact points with the auxiliary balls 4561, and each spherical surface of the balls 4553 facing the rotatable holder 453 abuts against the auxiliary balls 4561 at the two contact points.

In this embodiment, the two auxiliary balls 4561 of the auxiliary supporting structure 456 include two convex surfaces, and each spherical surface of the balls 4553 of the spherical supporting structure 455 facing the rotatable holder 453 has two contact points with the two convex surfaces. Furthermore, the spherical supporting structure 455 has a total of ten contact points with the auxiliary supporting structure 456.

In this embodiment, the rotatable holder 453 can pitch and yaw. Furthermore, the spherical supporting structure 455 is made of ferromagnetic material, such that the spherical supporting structure 455 can be attracted to the rotatable holder 453 by magnetic force. In addition, there is no relative displacement between the spherical supporting structure 455 and the fixed base 451.

When a curvature radius of each of the balls 4553 of the spherical supporting structure 455 is R, and a minimum distance between the spherical supporting structure 455 and the reflecting surface 4541 is D, the following conditions are satisfied: R=0.4 mm; D=0.79 mm; and R/D=0.51.

5th Embodiment

Figure 25:
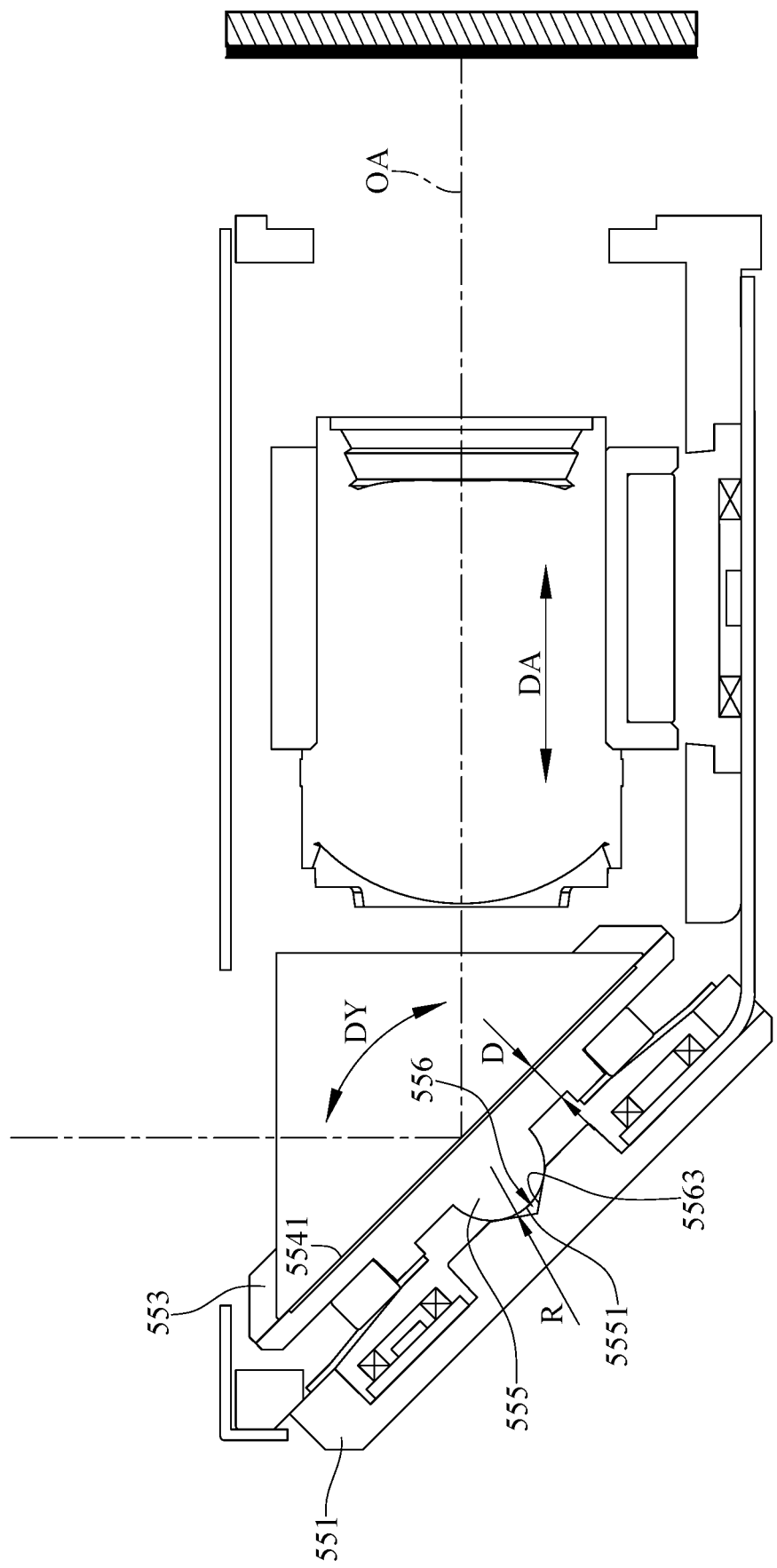
FIG. 25 is a cross-sectional view of a camera module according to the 5th embodiment of the present disclosure.

Please refer to FIG. 25, which is a cross-sectional view of a camera module according to the 5th embodiment of the present disclosure.

In this embodiment, a camera module 50 is provided, and the camera module 50 has a configuration similar to that of the camera module 10 disclosed in the 1st embodiment. The camera module 50 and the camera module 10 are different from each other in features of spherical supporting structure and auxiliary supporting structure.

In this embodiment, a spherical supporting structure 555 is a spherical protrusion formed on a surface of a rotatable holder 553 facing a fixed base 551. An auxiliary supporting structure 556 includes a pyramidal recess 5563 corresponding and configured to support the spherical supporting structure 555. The pyramidal recess 5563 is recessed from a surface of the fixed base 551 facing the rotatable holder 553. The pyramidal recess 5563 is a square based pyramidal recess having four lateral surfaces. Furthermore, the spherical supporting structure 555 includes a spherical surface 5551 facing the fixed base 551, and the spherical surface 5551 has four contact points with the pyramidal recess 5563, and the spherical surface 5551 and the pyramidal recess 5563 abut against each other at the four contact points.

In this embodiment, the rotatable holder 553 can pitch and yaw. In addition, there is no relative displacement between the spherical supporting structure 555 and the fixed base 551.

In this embodiment, the spherical supporting structure 555 and the rotatable holder 553 are made in one piece, but the present disclosure is not limited thereto. Furthermore, in this embodiment, the spherical supporting structure 555 is formed on the rotatable holder 553, and the pyramidal recess 5563 of the auxiliary supporting structure 556 is formed on the fixed base 551, but the present disclosure is not limited thereto. In other embodiments, the protrusion-type spherical supporting structure is formed on the fixed base, the pyramidal recess of the auxiliary supporting structure is recessed from the rotatable holder, and the spherical supporting structure and the fixed base can be made in one piece.

When a curvature radius of the spherical supporting structure 555 is R, and a minimum distance between the spherical supporting structure 555 and the reflecting surface 5541 is D, the following conditions are satisfied: R=0.8 mm; D=0.62 mm; and R/D=1.29.

6th Embodiment

Figure 26:
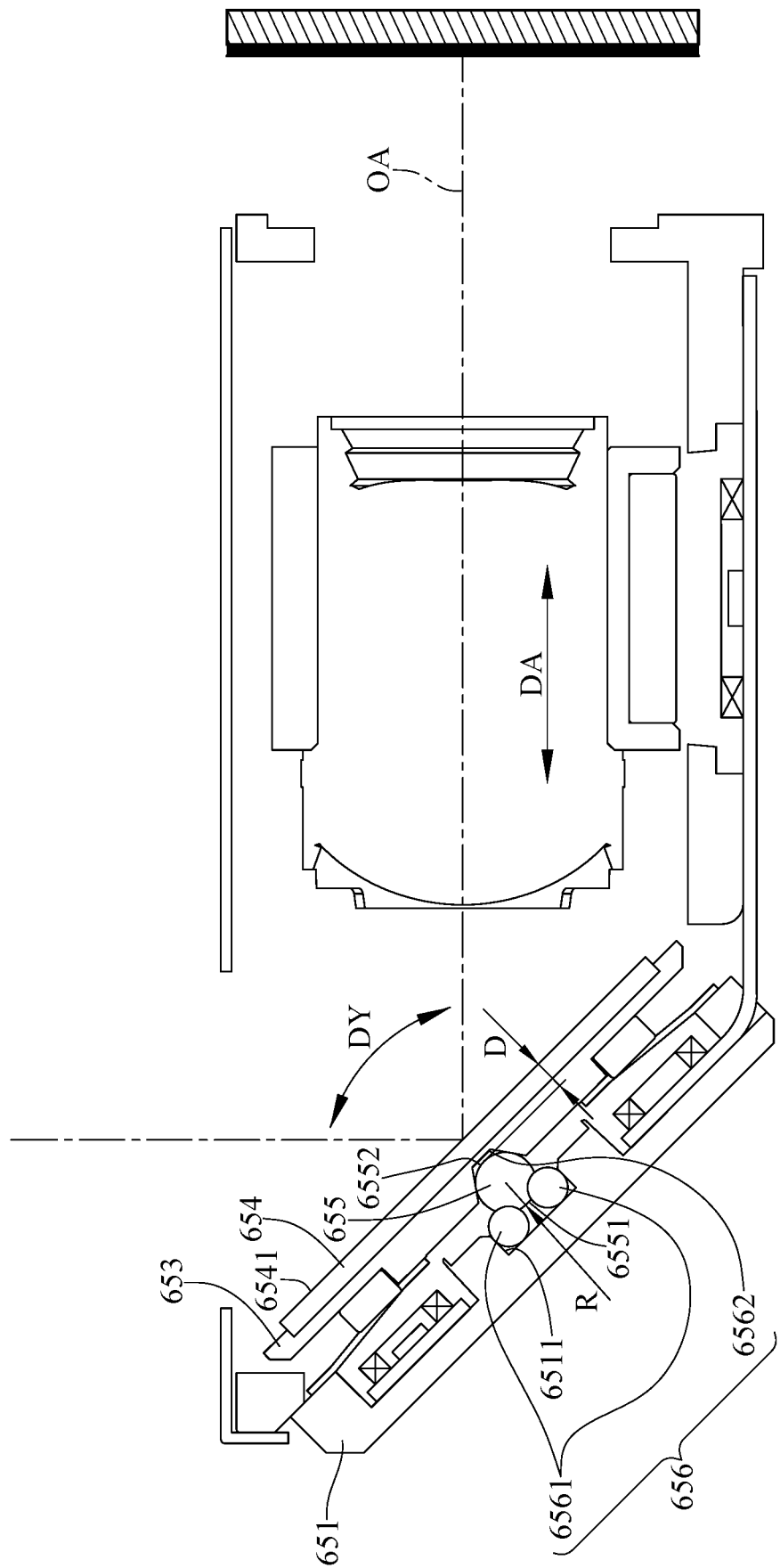
FIG. 26 is a cross-sectional view of a camera module according to the 6th embodiment of the present disclosure.
Figure 28:
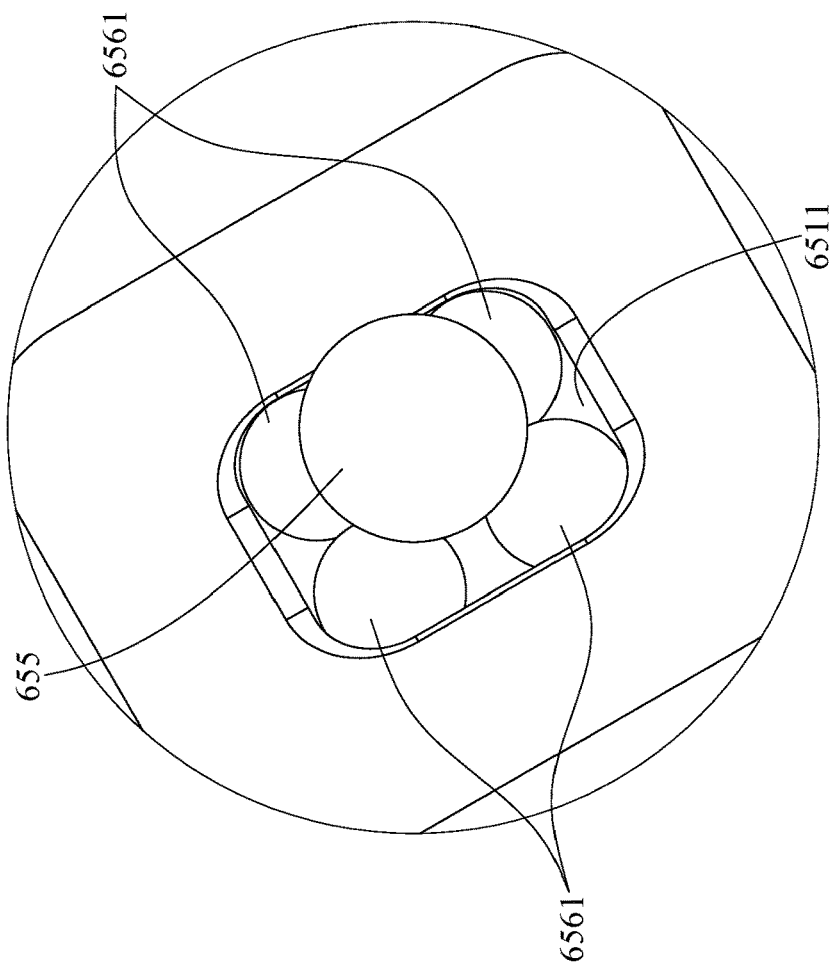
FIG. 28 is an enlarged view of region E of FIG. 27.
Figure 27:
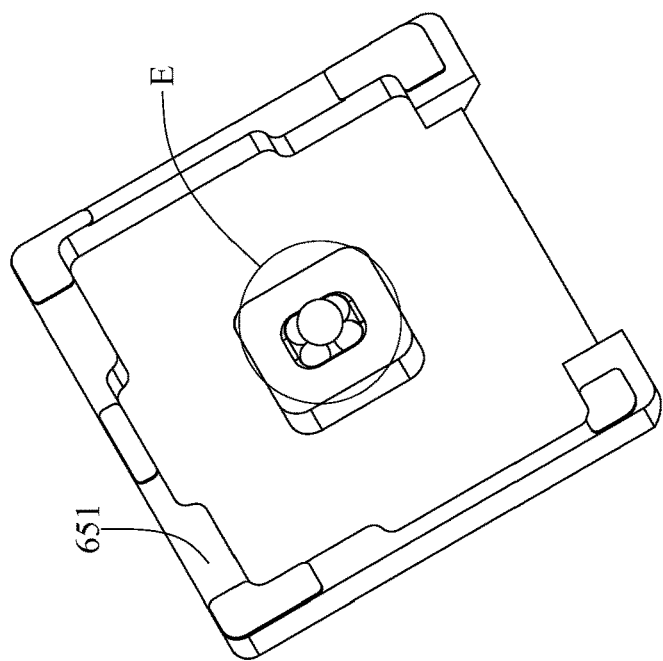
FIG. 27 is a perspective view of a fixed base, a spherical supporting structure and an auxiliary supporting structure in FIG. 26.

Please refer to FIG. 26 to FIG. 28, where FIG. 26 is a cross-sectional view of a camera module according to the 6th embodiment of the present disclosure, FIG. 27 is a perspective view of a fixed base, a spherical supporting structure and an auxiliary supporting structure in FIG. 26, and FIG. 28 is an enlarged view of region E of FIG. 27.

In this embodiment, a camera module 60 is provided, and the camera module 60 has a configuration similar to that of the camera module 10 disclosed in the 1st embodiment. The camera module 60 and the camera module 10 are different from each other in features of reflecting element, spherical supporting structure and auxiliary supporting structure.

In this embodiment, a reflecting element 654 is a reflection mirror disposed on a rotatable holder 653, and the reflecting element 654 and a fixed base 651 are disposed on two opposite sides of the rotatable holder 653. The reflecting element 654 has a reflecting surface 6541 configured to fold an optical path of incident light.

A spherical supporting structure 655 is a ball disposed between the rotatable holder 653 and the fixed base 651. An auxiliary supporting structure 656 includes four auxiliary balls 6561 and a pyramidal recess 6562 corresponding and configured to support the spherical supporting structure 655.

The auxiliary balls 6561 are disposed in an accommodation recess 6511 of the fixed base 651, and the pyramidal recess 6562 is recessed from a surface of the rotatable holder 653 facing the fixed base 651. The pyramidal recess 6562 is a square based pyramidal recess having four lateral surfaces. Furthermore, the spherical supporting structure 655 has two spherical surfaces 6551 and 6552 respectively facing the fixed base 651 and the rotatable holder 653. The spherical surface 6551 facing the fixed base 651 has four contact points with the auxiliary balls 6561, and the spherical surface 6551 and the auxiliary balls 6561 abut against each other at the four contact points. The spherical surface 6552 facing the rotatable holder 653 has four contact points with the pyramidal recess 6562, and the spherical surface 6552 abuts against the pyramidal recess 6562 at the four contact points.

In this embodiment, the four auxiliary balls 6561 of the auxiliary supporting structure 656 include four convex surfaces, and the spherical surface 6551 of the spherical supporting structure 655 facing the fixed base 651 has four contact points with the four convex surfaces. In addition, the spherical supporting structure 655 has a total of eight contact points with the auxiliary supporting structure 656.

In this embodiment, the rotatable holder 653 can pitch and yaw. Furthermore, the spherical supporting structure 655 is made of ferromagnetic material, such that the spherical supporting structure 655 can be attracted to the rotatable holder 653 by magnetic force. In addition, there is no relative displacement between the spherical supporting structure 655 and the fixed base 651.

When a curvature radius of the spherical supporting structure 655 is R, and a minimum distance between the spherical supporting structure 655 and the reflecting surface 6541 is D, the following conditions are satisfied: R=0.45 mm; D=0.45 mm; and R/D=1.0.

7th Embodiment

Figure 29:
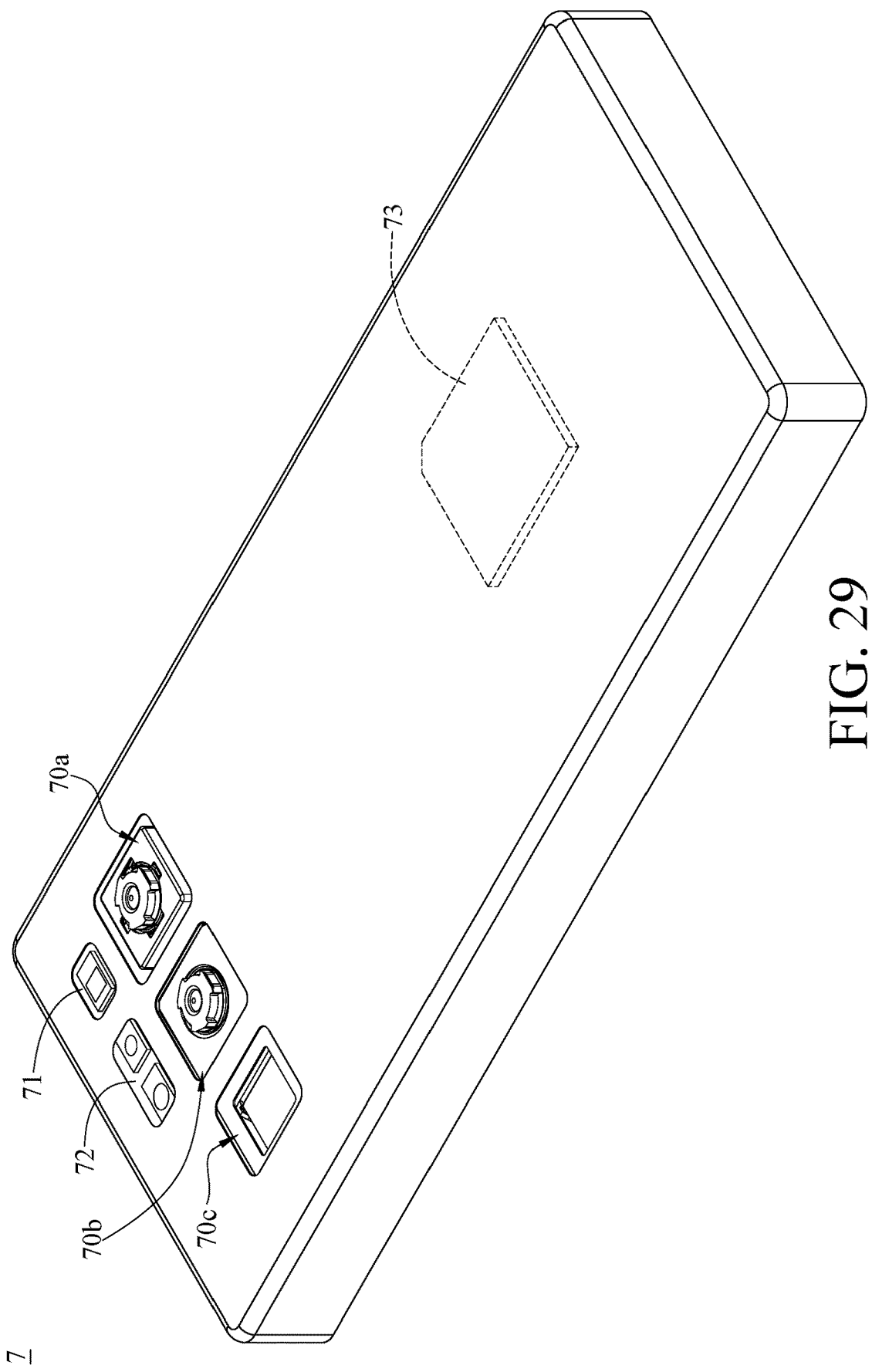
FIG. 29 is one perspective view of an electronic device according to the 7th embodiment of the present disclosure.
Figure 30:
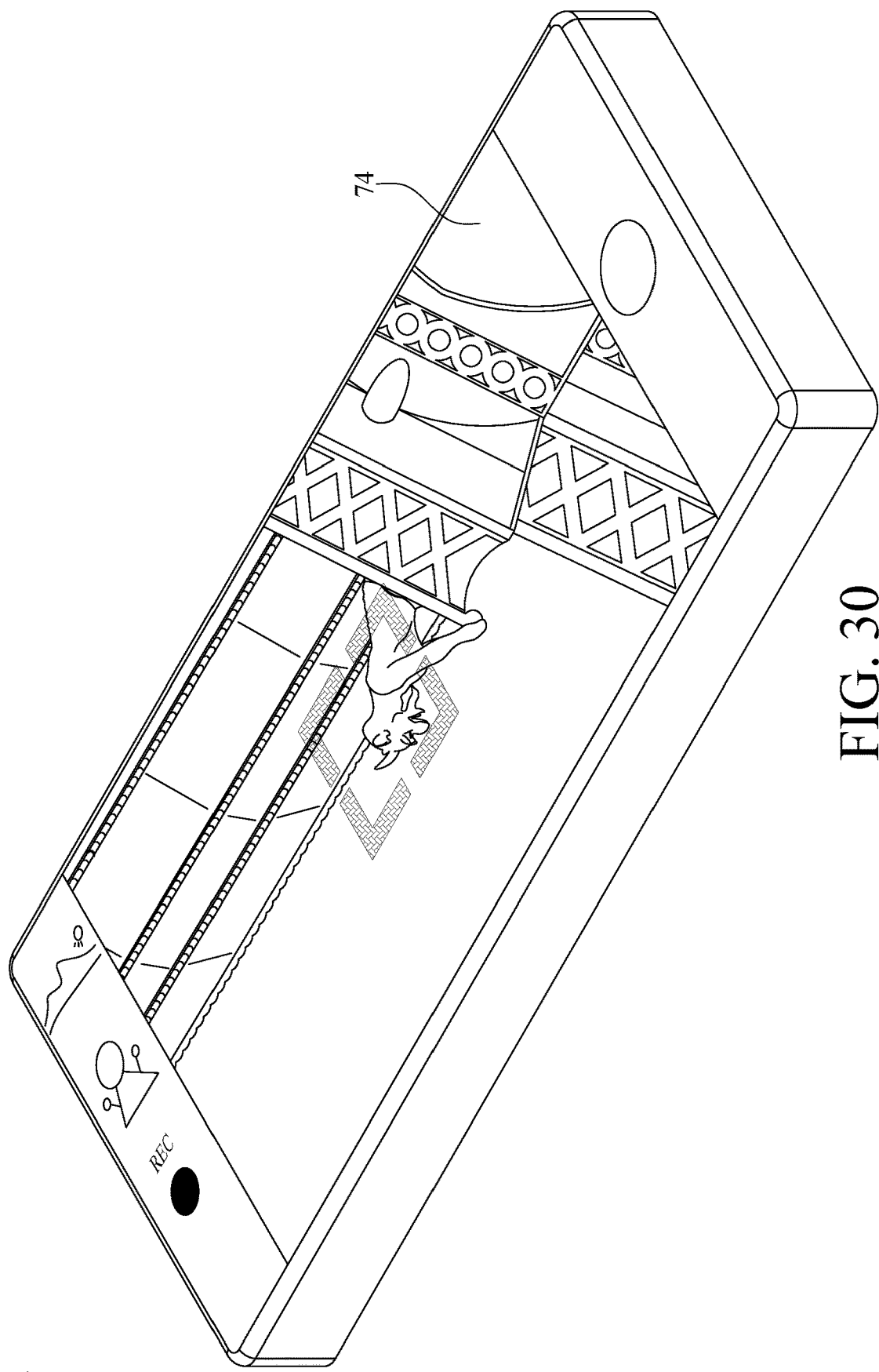
FIG. 30 is another perspective view of the electronic device in FIG. 29.

Please refer to FIG. 29 and FIG. 30, where FIG. 29 is one perspective view of an electronic device according to the 7th embodiment of the present disclosure, and FIG. 30 is another perspective view of the electronic device in FIG. 29.

In this embodiment, an electronic device 7 is a smartphone including a plurality of camera modules, a flash module 71, a focus assist module 72, an image signal processor 73, a display unit (a user interface) 74 and an image software processor.

The camera modules include an ultra-wide-angle camera module 70*a*, a high pixel camera module 70*b* and a telephoto camera module 70*c*. The camera module disclosed in the 1st embodiment is taken as the telephoto camera module 70*c*, but the present disclosure is not limited thereto. Camera modules disclosed in other embodiments can also be taken as the telephoto camera module 70*c*.

Figure 31:
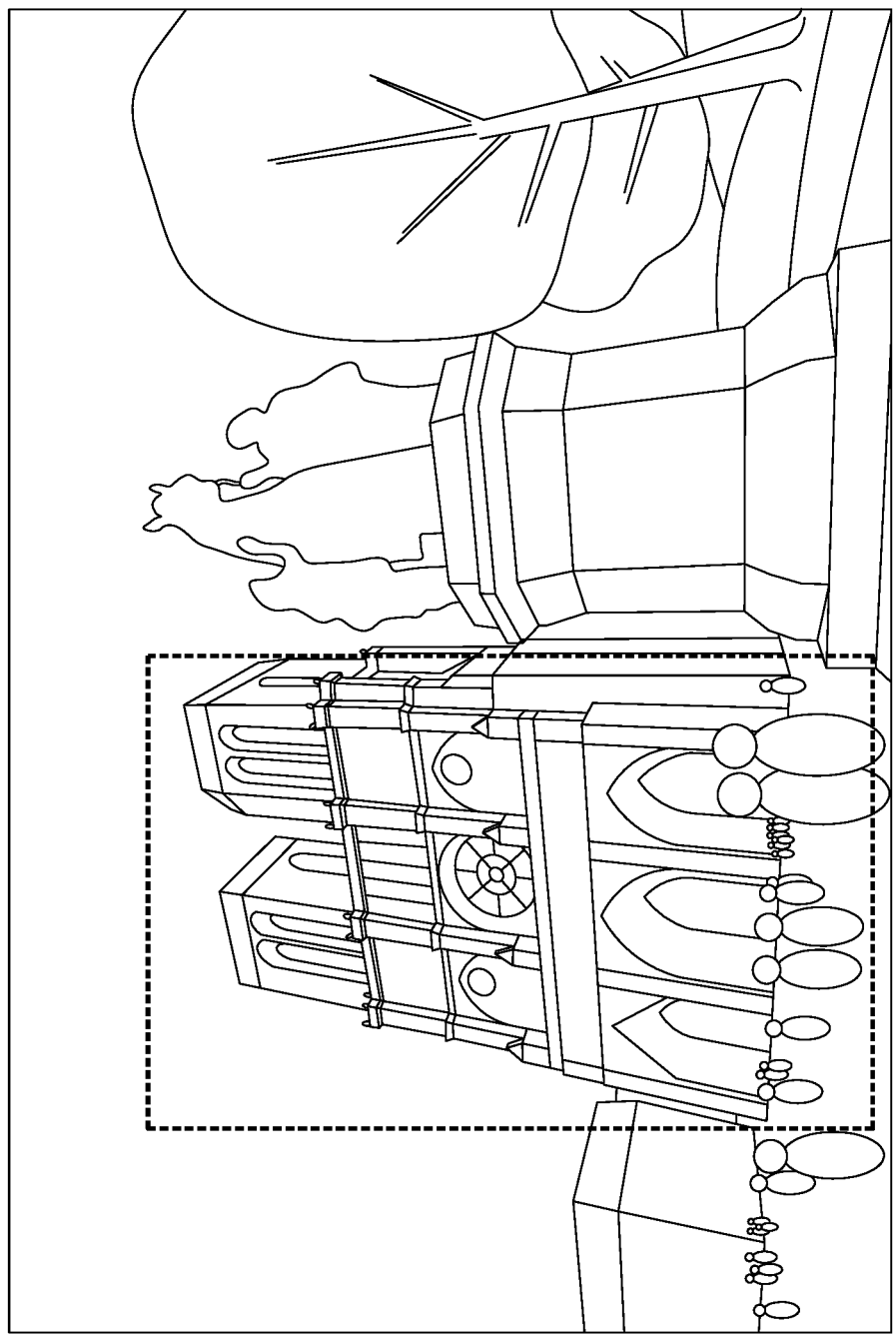
FIG. 31 is an image captured by an ultra-wide-angle camera module.

The image captured by the ultra-wide-angle camera module 70*a* enjoys a feature of multiple imaged objects. FIG. 31 is an image captured by the ultra-wide-angle camera module 70*a*.

Figure 32:
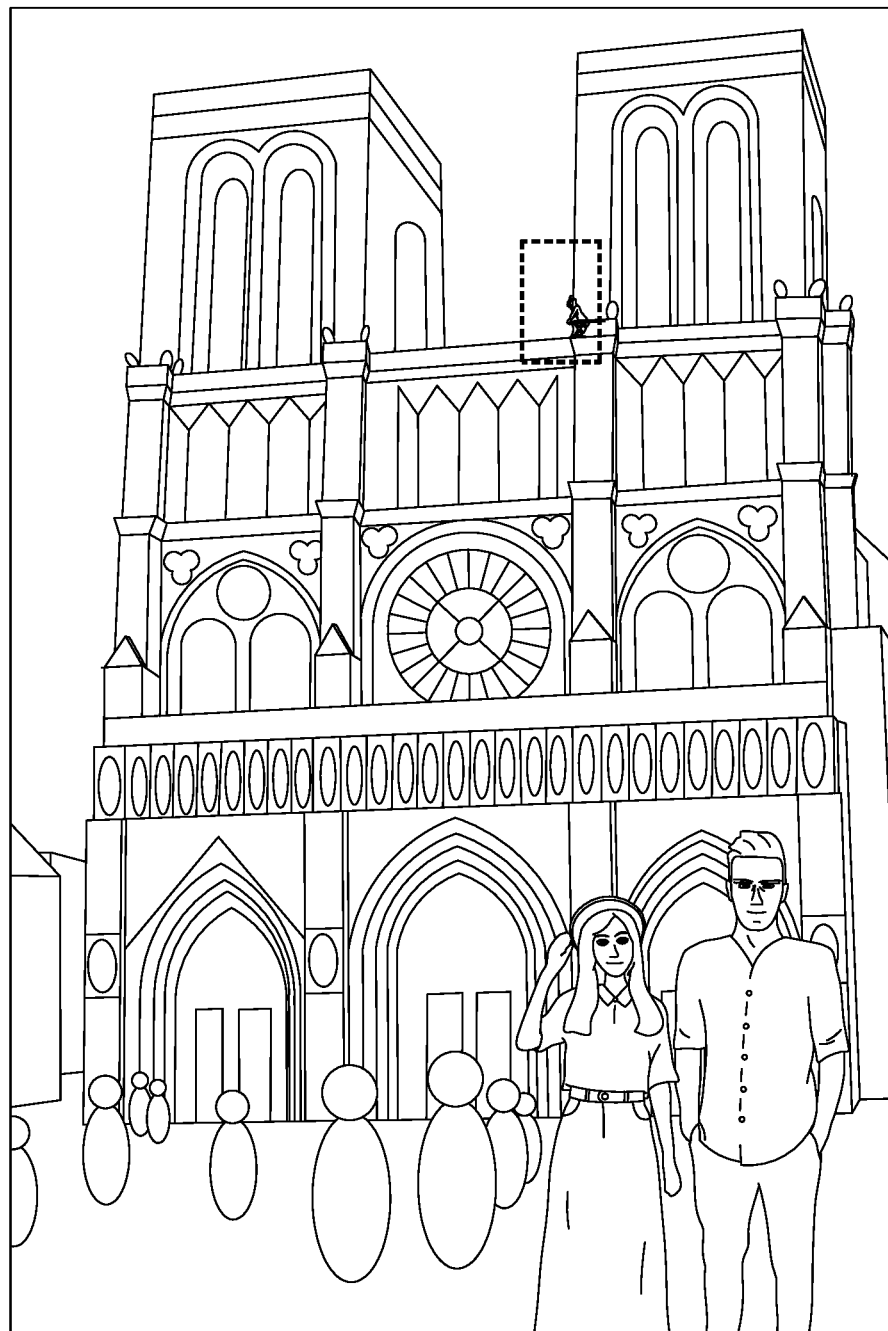
FIG. 32 is an image captured by a high pixel camera module.

The image captured by the high pixel camera module 70*b* enjoys a feature of high resolution and less distortion, and the high pixel camera module 70*b* can capture part of the image in FIG. 31. FIG. 32 is an image captured by the high pixel camera module 70*b*.

Figure 33:
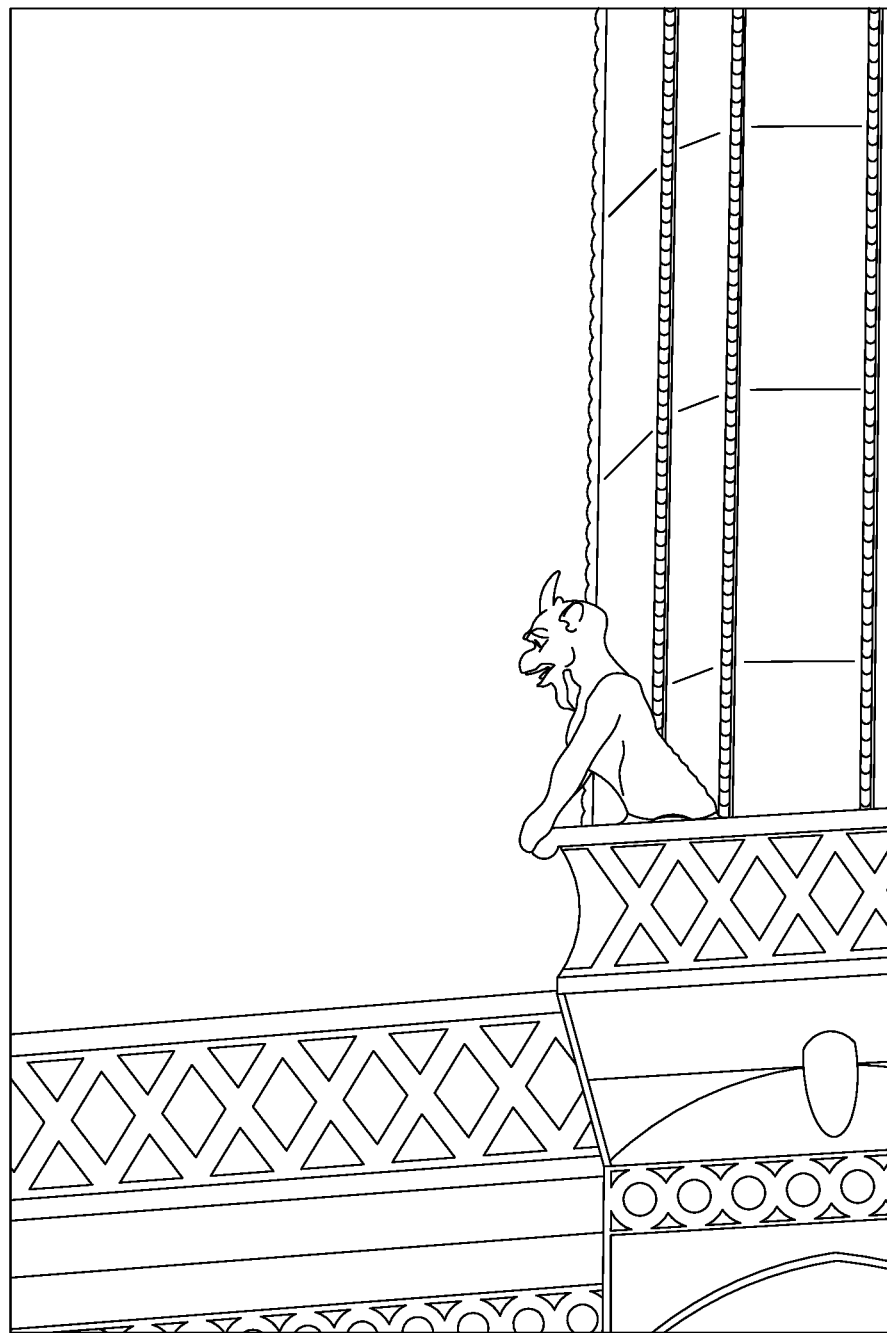
FIG. 33 is an image captured by a telephoto camera module.

The image captured by the telephoto camera module 70*c* enjoys a feature of high optical magnification, and the telephoto camera module 70*c* can capture part of the image in FIG. 32. FIG. 33 is an image captured by the telephoto camera module 70*c*. The maximum field of view (FOV) of the camera module corresponds to the field of view in FIG. 33.

When a user captures images of an object, the light rays converge in the ultra-wide-angle camera module 70*a*, the high pixel camera module 70*b* or the telephoto camera module 70*c* to generate an image(s), and the flash module 71 is activated for light supplement. The focus assist module 72 detects the object distance of the imaged object to achieve fast auto focusing. The image signal processor 73 is configured to optimize the captured image to improve image quality and provided zooming function. The light beam emitted from the focus assist module 72 can be either conventional infrared or laser. The display unit 74 can be a touch screen or a physical button. The user is able to interact with the display unit 74 and the image software processor having multiple functions to capture images and complete image processing. The image processed by the image software processor can be displayed on the display unit 74.

8th Embodiment

Figure 34:
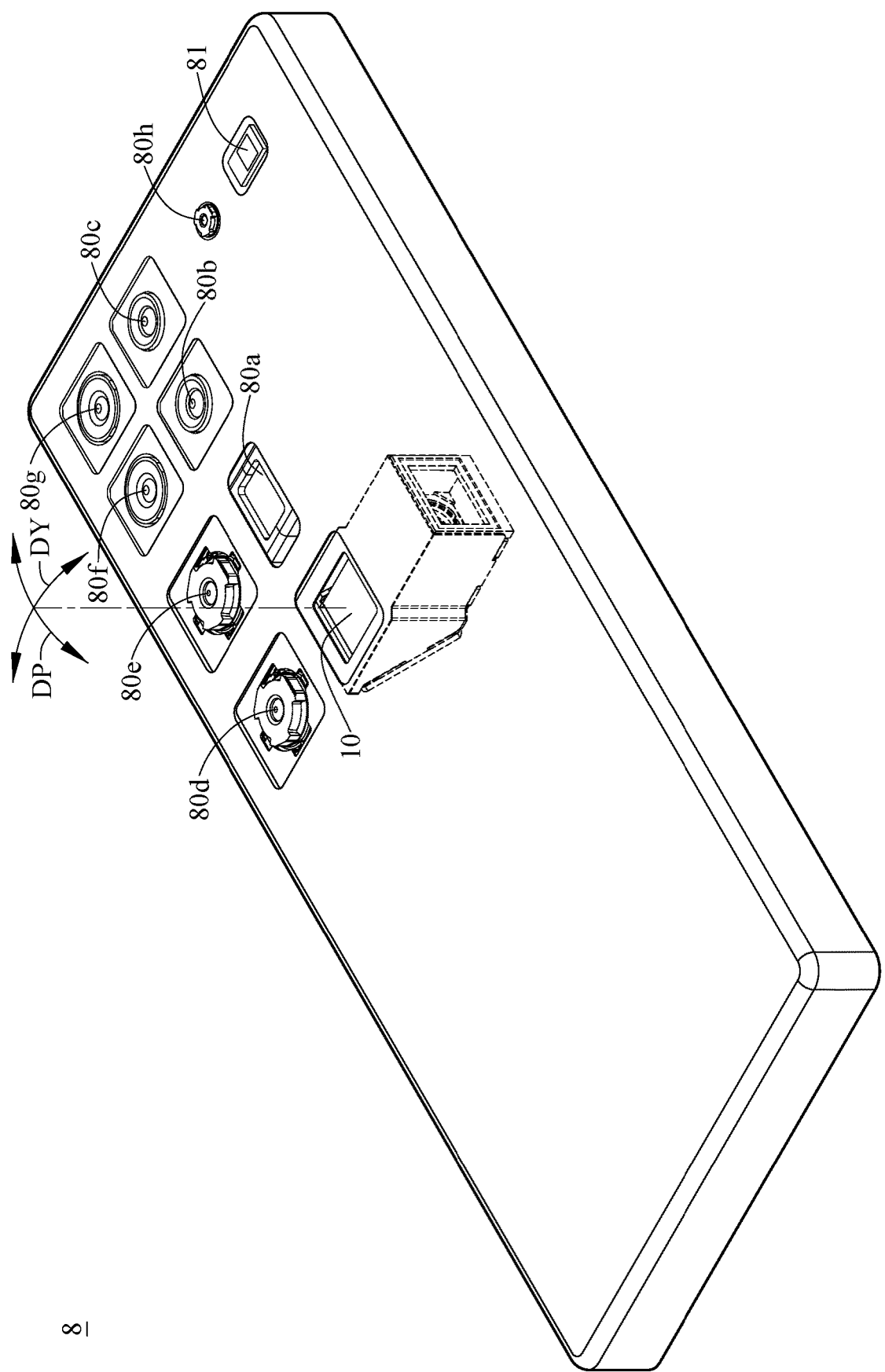
FIG. 34 is one perspective view of an electronic device according to the 8th embodiment of the present disclosure.

Please refer to FIG. 34, which is one perspective view of an electronic device according to the 8th embodiment of the present disclosure.

In this embodiment, an electronic device 8 is a smartphone including the camera module 10 disclosed in the 1st embodiment, a camera module 80*a*, a camera module 80*b*, a camera module 80*c*, a camera module 80*d*, a camera module 80*e*, a camera module 80*f*, a camera module 80*g*, a camera module 80*h*, a flash module 81, an image signal processor, a display unit and an image software processor (not shown). The camera module 10, the camera module 80*a*, the camera module 80*b*, the camera module 80*c*, the camera module 80*d*, the camera module 80*e*, the camera module 80*f*, the camera module 80*g* and the camera module 80*h* are disposed on the same side of the electronic device 8, while the display unit is disposed on the opposite side of the electronic device 8.

The camera module 10 is a telephoto camera module, the camera module 80*a* is a telephoto camera module, the camera module 80*b* is a telephoto camera module, the camera module 80*c* is a telephoto camera module, the camera module 80*d* is a wide-angle camera module, the camera module 80*e* is a wide-angle camera module, the camera module 80*f* is an ultra-wide-angle camera module, the camera module 80*g* is an ultra-wide-angle camera module, and the camera module 80*h* is a ToF (time of flight) camera module. In this embodiment, the camera module 10, the camera module 80*a*, the camera module 80*b*, the camera module 80*c*, the camera module 80*d*, the camera module 80*e*, the camera module 80*f* and the camera module 80*g* have different fields of view, such that the electronic device 8 can have various magnification ratios so as to meet the requirement of optical zoom functionality. In addition, the camera module 10 and the camera module 80*a* are telephoto camera modules having a light-folding element configuration. In addition, the camera module 80*h* can determine depth information of the imaged object. In this embodiment, the electronic device 8 includes multiple camera modules 10, 80*a*, 80*b*, 80*c*, 80*d*, 80*e*, 80*f*, 80*g*, and 80*h*, but the present disclosure is not limited to the number and arrangement of camera module. When a user captures images of an object, the light rays converge in the camera modules 10, 80*a*, 80*b*, 80*c*, 80*d*, 80*e*, 80*f*, 80*g* or 80*h* to generate an image(s), and the flash module 81 is activated for light supplement. Further, the subsequent processes are performed in a manner similar to the abovementioned embodiments, so the details in this regard will not be provided again.

The smartphones in the embodiments are only exemplary for showing the camera modules 10, 20, 30, 40, 50, 60 of the present disclosure installed in an electronic device, and the present disclosure is not limited thereto. The camera modules 10, 20, 30, 40, 50, 60 can be optionally applied to optical systems with a movable focus. Furthermore, the camera modules 10, 20, 30, 40, 50, 60 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A reflection module capable of image stabilization, comprising:
    a reflecting element, having a reflecting surface, wherein the reflecting element is configured to fold an optical path of incident light;
    a rotatable holder, wherein the reflecting element is disposed on the rotatable holder;
    a fixed base, connected to the rotatable holder via an elastic element;
    a spherical supporting structure, disposed between the rotatable holder and the fixed base;
    an auxiliary supporting structure, disposed on at least one of the rotatable holder and the fixed base, wherein the auxiliary supporting structure corresponds to the spherical supporting structure; and
    an image stabilizing actuator, wherein at least a part of the image stabilizing actuator is disposed on the rotatable holder, and the image stabilizing actuator is configured to drive the rotatable holder to rotate by taking the spherical supporting structure as a rotation center;
    wherein the spherical supporting structure is a ball, and the spherical supporting structure has at least three contact points with the auxiliary supporting structure;
    wherein a curvature radius of the spherical supporting structure is R, a minimum distance between the spherical supporting structure and the reflecting surface is D, and the following condition is satisfied:
    $0.3 < R/D < 12$.

2. The reflection module of claim 1, wherein the elastic element provides a preload force to the rotatable holder, and the preload force is in a direction towards the fixed base, such that the spherical supporting structure located between the fixed base and the rotatable holder supports the rotatable holder.

3. The reflection module of claim 2, wherein the elastic element surrounds the spherical supporting structure.

4. The reflection module of claim 1, wherein the image stabilizing actuator comprises at least one driving magnet and at least one driving coil, one of the at least one driving magnet and the at least one driving coil is disposed on the rotatable holder, and other of the at least one driving magnet and the at least one driving coil is disposed on the fixed base.

5. The reflection module of claim 4, wherein the at least one driving magnet and the at least one driving coil face each other in a direction perpendicular to the reflecting surface.

6. The reflection module of claim 4, wherein a number of the at least one driving magnet is at least two, a number of the at least one driving coil is at least two, and the at least two driving magnets respectively face the at least two driving coils in a direction perpendicular to the reflecting surface.

7. The reflection module of claim 1, wherein the curvature radius of the spherical supporting structure is R, the minimum distance between the spherical supporting structure and the reflecting surface is D, and the following condition is satisfied:
    $0.5 < R/D < 10$.

8. The reflection module of claim 1, wherein there is no relative displacement between the spherical supporting structure and the fixed base.

9. The reflection module of claim 8, wherein the auxiliary supporting structure comprises at least three auxiliary balls, and the at least three auxiliary balls are configured to support the spherical supporting structure.

10. The reflection module of claim 8, wherein the auxiliary supporting structure comprises at least three spherical protrusions, and the at least three spherical protrusions are configured to support the spherical supporting structure.

11. The reflection module of claim 8, wherein the auxiliary supporting structure comprises a pyramidal recess, and the pyramidal recess is configured to support the spherical supporting structure.

12. The reflection module of claim 1, wherein the spherical supporting structure is made of ferromagnetic material.

13. The reflection module of claim 1, wherein the reflecting element is a plastic prism manufactured by injection molding, the reflecting element has a light entrance surface and a light exit surface, the light entrance surface and the reflecting surface are disposed corresponding to each other, and the light exit surface and the reflecting surface are disposed corresponding to each other.

14. The reflection module of claim 13, wherein at least one of the light entrance surface and the light exit surface has an optical aspheric surface.

15. The reflection module of claim 13, wherein the reflecting element has an engagement structure, the engagement structure surrounds the reflecting surface, and the reflecting element is attached to the rotatable holder via the engagement structure.

16. A camera module, comprising:
    the reflection module of claim 1;
    an imaging lens module, wherein the reflection module is disposed on an object side of the imaging lens module; and
    an image sensor, disposed on an image surface of the imaging lens module;

wherein the reflection module is configured to stabilize an image signal captured by the image sensor.

17. An electronic device, comprising:
the camera module of claim 16.

18. A reflection module capable of image stabilization, comprising:
a reflecting element, having a reflecting surface, wherein the reflecting element is configured to fold an optical path of incident light;
a rotatable holder, wherein the reflecting element is disposed on the rotatable holder;
a fixed base, connected to the rotatable holder via an elastic element;
a spherical supporting structure, disposed between the rotatable holder and the fixed base;
an auxiliary supporting structure, disposed on at least one of the rotatable holder and the fixed base, wherein the auxiliary supporting structure corresponds to the spherical supporting structure; and
an image stabilizing actuator, wherein at least a part of the image stabilizing actuator is disposed on the rotatable holder, and the image stabilizing actuator is configured to drive the rotatable holder to rotate by taking the spherical supporting structure as a rotation center;
wherein the spherical supporting structure comprises at least one spherical surface, the auxiliary supporting structure comprises at least two convex surfaces, and the at least one spherical surface has at least two contact points with the at least two convex surfaces;
wherein a curvature radius of the spherical supporting structure is R, a minimum distance between the spherical supporting structure and the reflecting surface is D, and the following condition is satisfied:
$0.3 < R/D < 12$.

19. The reflection module of claim 18, wherein the curvature radius of the spherical supporting structure is R, the minimum distance between the spherical supporting structure and the reflecting surface is D, and the following condition is satisfied:
$0.5 < R/D < 10$.

20. The reflection module of claim 18, wherein the elastic element provides a preload force to the rotatable holder, and the preload force is in a direction towards the fixed base, such that the spherical supporting structure located between the fixed base and the rotatable holder supports the rotatable holder.

21. The reflection module of claim 20, wherein the elastic element surrounds the spherical supporting structure.

22. The reflection module of claim 18, wherein the auxiliary supporting structure comprises at least two auxiliary balls, the at least two auxiliary balls have the at least two convex surfaces, and the at least two auxiliary balls are configured to support the spherical supporting structure.

23. The reflection module of claim 18, wherein the auxiliary supporting structure comprises at least two spherical protrusions, the at least two spherical protrusions have the at least two convex surfaces, and the at least two spherical protrusions are configured to support the spherical supporting structure.

24. The reflection module of claim 18, wherein the image stabilizing actuator comprises at least one driving magnet and at least one driving coil, one of the at least one driving magnet and the at least one driving coil is disposed on the rotatable holder, and other of the at least one driving magnet and the at least one driving coil is disposed on the fixed base.

25. The reflection module of claim 24, wherein the at least one driving magnet and the at least one driving coil face each other in a direction perpendicular to the reflecting surface.

26. A reflection module capable of image stabilization, comprising:
a reflecting element, having a reflecting surface, wherein the reflecting element is configured to fold an optical path of incident light;
a rotatable holder, wherein the reflecting element is disposed on the rotatable holder;
a fixed base, connected to the rotatable holder via an elastic element;
a spherical supporting structure, disposed between the rotatable holder and the fixed base;
an auxiliary supporting structure, disposed on at least one of the rotatable holder and the fixed base, wherein the auxiliary supporting structure corresponds to the spherical supporting structure; and
an image stabilizing actuator, wherein at least a part of the image stabilizing actuator is disposed on the rotatable holder, and the image stabilizing actuator is configured to drive the rotatable holder to rotate by taking the spherical supporting structure as a rotation center;
wherein the spherical supporting structure comprises at least one spherical surface, and the at least one spherical surface has at least three contact points with the auxiliary supporting structure;
wherein a curvature radius of the spherical supporting structure is R, a minimum distance between the spherical supporting structure and the reflecting surface is D, and the following condition is satisfied:
$0.3 < R/D < 12$.

27. The reflection module of claim 26, wherein the curvature radius of the spherical supporting structure is R, a minimum distance between the spherical supporting structure and the reflecting surface is D, and the following condition is satisfied:
$0.5 < R/D < 10$.

28. The reflection module of claim 26, wherein the elastic element provides a preload force to the rotatable holder, and the preload force is in a direction towards the fixed base, such that the spherical supporting structure located between the fixed base and the rotatable holder supports the rotatable holder.

29. The reflection module of claim 28, wherein the elastic element surrounds the spherical supporting structure.

* * * * *